Sept. 29, 1953 G. C. ELLERBECK 2,653,762

DIVIDEND ALIGNING MECHANISM

Filed Dec. 22, 1948 9 Sheets-Sheet 1

INVENTOR.
GRANT C. ELLERBECK
BY

INVENTOR.
GRANT C. ELLERBECK
BY
[signature]

Sept. 29, 1953 G. C. ELLERBECK 2,653,762

DIVIDEND ALIGNING MECHANISM

Filed Dec. 22, 1948 9 Sheets-Sheet 3

INVENTOR.
GRANT C. ELLERBECK
BY

Sept. 29, 1953 G. C. ELLERBECK 2,653,762

DIVIDEND ALIGNING MECHANISM

Filed Dec. 22, 1948 9 Sheets-Sheet 4

INVENTOR.
GRANT C. ELLERBECK
BY
[signature]

Sept. 29, 1953 G. C. ELLERBECK 2,653,762

DIVIDEND ALIGNING MECHANISM

Filed Dec. 22, 1948 9 Sheets-Sheet 5

INVENTOR.
GRANT C. ELLERBECK
BY

DIVIDEND ALIGNING MECHANISM

Filed Dec. 22, 1948

INVENTOR.

GRANT C. ELLERBECK

BY

DIVIDEND ALIGNING MECHANISM

Filed Dec. 22, 1948 9 Sheets-Sheet 7

INVENTOR.
GRANT C. ELLERBECK
BY

INVENTOR.
GRANT C. ELLERBECK
BY

Sept. 29, 1953 G. C. ELLERBECK 2,653,762

DIVIDEND ALIGNING MECHANISM

Filed Dec. 22, 1948 9 Sheets-Sheet 9

INVENTOR.
GRANT C. ELLERBECK
BY

Patented Sept. 29, 1953 2,653,762

UNITED STATES PATENT OFFICE 2,653,762

DIVIDEND ALIGNING MECHANISM

Grant C. Ellerbeck, Hayward, Calif., assignor to Friden Calculating Machine Co., Inc., a corporation of California Application December 22, 1948, Serial No. 66,745

22 Claims. (Cl. 235—63)

This invention relates to improvements in calculating machines and more particularly to a mechanism for automatically aligning the dividend and divisor as a prelude to an automatic division operation.

In all of the presently known and existing types of calculating machine which are provided with means for automatically controlling the functioning of the various mechanisms of the machine during division operations, it is first necessary for the operator of the machine to align the dividend and divisor. This is ordinarily done by visual inspection of the factors and manipulation of the shift keys until the factors are brought into alignment after which the division key is depressed and the automatic division operation begun. The purpose of the present invention is to eliminate the factor aligning step in division operations and to cause the factors to be automatically aligned after the division key is depressed.

It is, therefore, an object of the present invention to provide an improved automatic division mechanism for calculating machines which will cause the factors to be aligned and the dividend to be divided by the divisor in one continuous automatic operation.

Another object of the invention is to utilize the existing automatic division mechanism of the calculating machine in order to cause alignment of the factors prior to the outset of the actual dividing operation of one factor by another.

Another object of the invention is to so modify the existing division program control mechanism of a calculating machine as to cause this mechanism to serve as a factor aligning device as well as a structure for automatically controlling the division operation.

Another object of the invention is to provide a calculating machine with a program control device which is settable from an idle position to a factor aligning position and also to an automatic division position, the device being automatically moved from one position to another so as to cause the factors to be aligned and the dividend to be divided by the divisor in one continuous, uninterrupted operation.

Another object of the invention is to provide a mechanism for terminating the factor aligning operation and conditioning the machine for a dividing operation when the carriage reaches its end position.

Still another object of the invention is to provide means for stoppage of the machine by the conventional division stop lever while the factors are being aligned.

The present invention is concerned with these and other objects which will become apparent from the following description of a preferred embodiment of the invention as shown in the accompanying drawings in which:

Fig. 5 is a view showing the mechanism mounted on the left-hand side of the control plate.

Fig. 9 is a schematic view illustrating a portion of the modified program control mechanism of the machine.

Fig. 10 is a cross-sectional elevation taken along the line 10—10 in Fig. 2 showing certain of the mechanism utilized for controlling the machine in division operations from the highest order numeral wheel of the accumulator.

Although the invention is shown in connection with a calculating machine of the type disclosed in U. S. Patent No. 2,229,889, issued to Carl M. F. Friden on January 28, 1941, it is not intended that its use should be confined only to a machine of this type since it is evident that the underlying principles thereof may be advantageously applied to other types or designs of calculating machines.

Inasmuch as the basic machine in which the present invention is incorporated is fully shown and described in the above-mentioned Patent No. 2,229,889, only so much of the fundamental machine is hereinafter disclosed as is necessary for a complete understanding of the invention. Similarly, the automatic division mechanism herein employed is essentially like that illustrated in U. S. Patent No. 2,327,981, issued to Carl M. F. Friden on August 31, 1943, and therefore only those parts of the automatic division mechanism which are directly concerned with the present invention will be shown and described in this application.

*Selecting and actuating mechanisms*

Figure 1:
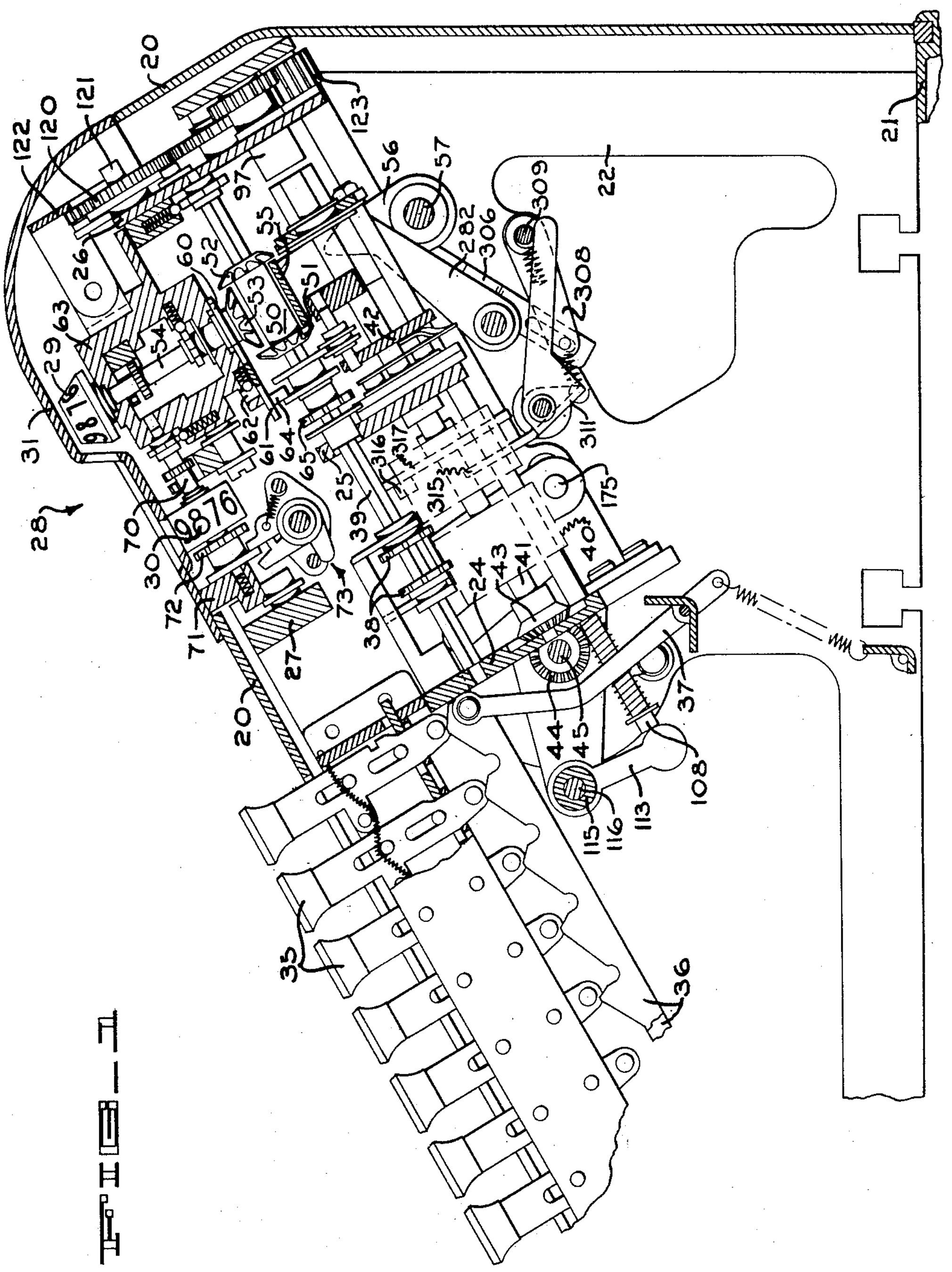
Fig. 1 is a longitudinal sectional elevation through the machine showing the selecting and actuating mechanisms thereof together with the accumulator and revolutions counter which are mounted in the shiftable carriage of the machine.
Figure 2:
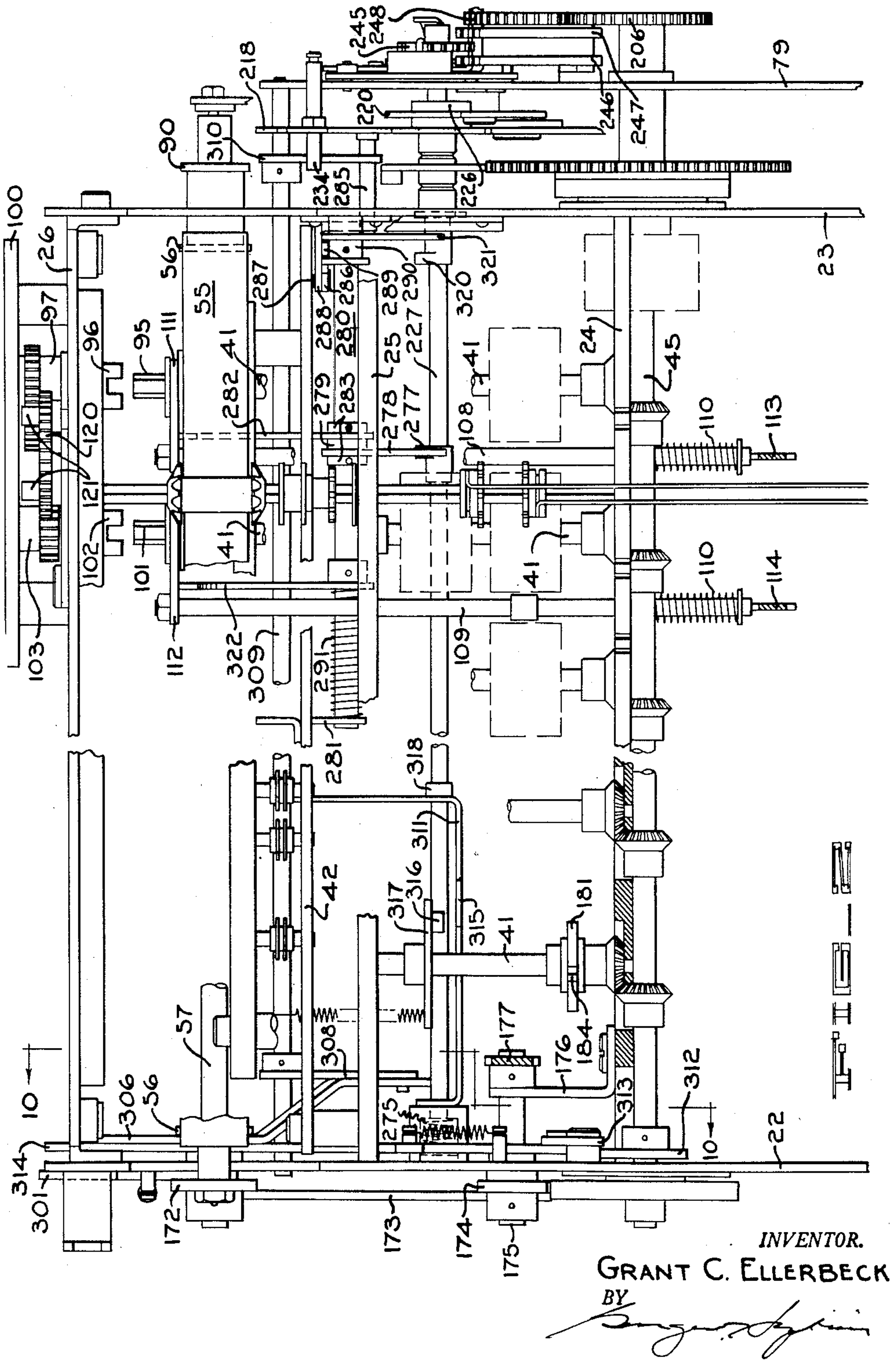
Fig. 2 is a plan view showing the selecting and actuating mechanisms of the machine and also certain parts of the factor aligning mechanism.

As shown in Fig. 1 of the drawings, the calculating machine is enclosed by covers 20 and is provided with a base 21 to which is fastened a left side frame 22 and a right side frame 23 (see also Fig. 2). The side frames 22 and 23 are supported in spaced relationship by means of crossbars 24, 25, 26 and 27, which crossbars also serve to support much of the operating mechanism of the machine. On the rear of the machine is provided a transversely shiftable numeral wheel carriage 28 in which the accumulator numeral wheels 29 and revolutions counter wheels 30 are mounted. The carriage is provided with a cover 31 having suitable apertures formed therein through which the wheels 29 and 30 may be viewed. The values to be entered into the accumulator wheels 29 may be determined by means of a plurality of similar selecting mechanisms which are associated with amount keys 35 of the keyboard. For this purpose each bank of amount keys cooperates with a pair of similar value selecting slides 36 which are mounted for endwise movement on supporting links 37 (only one shown) and extend through suitable slots provided therefor in the forward crossbar 24.

Each selecting slide 36 is connected at its rear end with a ten tooth selector gear 38 which is slidably and non-rotatably mounted on a longitudinally extending square shaft 39 journalled in the crossbars 24, 25 and 26. Hence, the longitudinal movement of the slides 36, as differentially determined by the numeral keys 35, serves to position the selector gears 38 in the path of a series of stepped teeth provided on an actuating cylinder 40 secured to a shaft 41 journalled between the crossbar 24 and a transverse supporting bar 42. For each adjacent pair of keybanks there is provided one shaft 41 bearing a pair of actuating cylinders 40. Each actuator shaft 41 is provided at its forward end with a bevel gear 43 which meshes with a similar bevel gear 44 secured to a transverse power shaft 45 journalled between the side frames of the machine. The shaft 45 is cyclically and uni-directionally operated by means of a clutch control driving means of the type shown and described in Patent No. 2,327,981 so as to provide a single path of power flow from the electric driving motor to the various power operated mechanisms of the machine.

Each of the square shafts 39 carries at its rear end a slidably but non-rotatably mounted spool 50 to which is secured a ten tooth add gear 51 and a ten tooth subtract gear 52, which gears are adapted to cooperate with a similar ten tooth gear 53 secured to the lower end of each of the accumulator numeral wheel shafts 54.

When the machine is at rest, the gears 53 lie mid-way between the gears 51 and 52 so as to permit lateral shifting movement of the carriage, the gears 53 in this case being free to pass through the space existing between gears 51 and 52.

In order to enable an amount set up on the keys 35 to be added into the accumulator wheels 29 the spool 50 and gears 51 and 52 may be shifted toward the rear of the machine so as to engage the add gears 51 with the gears 53. This shifting of the gears is accomplished by means of a flat bar or gate 55 extending transversely across the machine and lying within the space provided between the add-subtract gears 51, 52. The gate 55 is supported at either end by a pair of similar arms 56 (only one shown) secured to a transverse gate shaft 57 journalled between the side frames 22 and 23. The shaft 57 may be rocked clockwise, as viewed in Fig. 1, in a manner hereinafter to be described so as to cause engagement of the add gears 51 with the gears 53 and alternatively the shaft may be rocked counterclockwise so as to result in engagement of the subtract gears 52 with the gears 53.

*Tens-transfer mechanism*

Secured to the lower end of each of the numeral wheel shafts 54 is a tens-transfer cam 60 which is adapted to cooperate with a transfer lever 61 which carries a stud 62 which is journalled in a hollow frame bar 63 of the carriage. The transfer lever 61 carries at its outer end a pin 64 which lies between a pair of flanges provided on the hub of a tens-transfer gear 65 lying in the next higher order of the machine. The gear 65 is arranged to be slidably but non-rotatably mounted on the shaft 39 whereby rotation of the gear may be transmitted through the add-subtract gears 51 or 52 to the numeral wheel shaft 54. Whenever the accumulator wheel 29 in a lower order passes from 0–9 or 9–0 a nose on the associated transfer cam 60 will rock the transfer lever 61 and move the pin 64 forwardly so as to move the transfer gear 65 in the next higher order into the path of an actuating tooth mounted on the associated shaft 41. Thereby, the square shaft 39 in the higher order will be given one step of movement over and above that imparted to the shaft by the associated actuating cylinder 40 and the higher order accumulator wheel 29 will thus be advanced one step so as to effect the carry from the lower order to the next higher order as required. After the tens-transfer has been effected, the gear 65 will be restored to its normal position on the shaft 39 by means of a restoring cam secured to the shaft 41 for this purpose.

*Revolutions counter*

As shown in Fig. 1, each of the revolutions counter numeral wheels 30 is secured to a longitudinally extending shaft 70 which is journalled at its rear end in the carriage frame bar 63 and at its forward end in a crossbar 71 which forms a part of the framework of the carriage. Each of the shafts 70 has secured thereto a gear 72 which is arranged to be actuated by a revolutions counter actuating mechanism 73 so as to cause the numeral wheels 30 to be operated in such a manner as to provide a count of the cyclic operations of the calculating machine and to also cause a tens-transfer to be effected from one order to the next higher order each time a wheel 30 passes through zero.

For a more complete disclosure of this mechanism reference is made to Patent No. 2,229,889 which covers the basic machine.

*Plus and minus keys*

In order to effect positive and negative registrations in the accumulator the calculating machine is provided with a plus key 77 (Fig. 5) and a minus key 78, both of which are slidably mounted on a control plate 79 secured to the right side frame 23 by means of suitable screws and spacing sleeves. The keys 77 and 78 are provided with roller studs 80 and 81 respectively, which cooperate with inclined cam faces 82 and 83 respectively, provided on a gate setting slide 84. This slide is pivotally connected at either end to the upper ends of arms 85 and 90, the arm 85 being pivoted on the control plate 79 while the arm 90 is secured to the gate shaft 57. Hence, forward and rearward movement of the slide 84 serves to rock the gate shaft clockwise or counter-clockwise, as the case may be, and thereby serves to cause engagement of the add gears 51 or the subtract gears 52 with the gears 53. Hence, when the plus key 77 is depressed, the stud 80 will engage with the inclined cam face 82 and cause the slide 84 to be moved rearwardly thereby causing clockwise rotation of the gate shaft 57 as viewed in Fig. 1 so as to condition the machine for an adding operation. In a similar manner, when the minus key 78 is depressed, the stud 81 will engage with the cam face 83 on the slide 84 and cause the shaft 57 to be rocked counter-clockwise (Fig. 1) and thereby cause the subtract gears to be engaged with the gears 53 so as to condition the machine for a subtracting operation.

In order to initiate the operation of the driving mechanism of the machine when either key 77 or 78 is depressed, each of these keys is provided with a half-round stud 86 which is adapted to cooperate with an inclined face 87 provided in a cycle initiating slide 88. The rear end of this slide bears against a stud 89 so that when either of the keys is depressed the stud will be moved rearwardly so as to cause the clutch to be engaged and the motor contacts to be closed thereby initiating a cycle of operation. For a more complete disclosure of this mechanism reference is made to Patent No. 2,327,981. When the clutch is engaged and the motor energized the power shaft 45 will be rotated thereby driving the actuator shafts 41, to which are secured the actuating cylinders 40, thereby causing the amount set up on the keys 35 to be run into the accumulator wheels 29 in either a positive or negative direction depending on which of the keys 77 or 78 is depressed.

*Carriage shift mechanism*

Means are provided for shifting the carriage 28 in either direction from one ordinal position to the other by power derived from the actuator shafts 41 under the control of a pair of shift keys (not shown). Reference is made to U. S. Patent No. 2,327,635, issued to Carl M. Friden on August 24, 1943, for a complete disclosure of the carriage shift mechanism and only so much of the mechanism will be shown herein as is necessary for a complete understanding of the present invention.

As is fully disclosed in the aforementioned patent, the right and left shift keys when depressed serve to engage the clutch and close the motor contacts so as to initiate cycling of the machine and also cause the right shift clutch or the left shift clutch, as the case may be, to be engaged and thus cause a shifting movement of the carriage in either a right-hand or a left-hand direction. As shown in Fig. 2, the rightmost actuator shaft 41 is provided at its rear end with an extension which drives a male clutch element 95 which lies in axial alignment with a female clutch element 96 formed on the forward end of a gear sleeve 97 which is journalled between the crossbar 26 and a bearing plate 100 secured to the bar 26 by means of suitable screws and spacer sleeves. In a similar manner, the second actuator shaft 41 from the right is extended rearwardly where it is provided with a male clutch element 101 adapted for engagement with a female element 102 formed on the forward end of a gear sleeve 103 journalled between the crossbar 26 and bearing plate 100. The clutch elements 95 and 101 are arranged for axial sliding movement whereby they may be engaged with the elements 96 or 102 respectively and thereby cause the gear sleeves 97 or 103 to be driven by power derived from the transverse power shaft 45.

For the purpose of engaging the elements 95 and 101 with their respective mating elements 96 or 102, a pair of push rods 108 and 109 are provided. As shown in Fig. 2, these rods are mounted for longitudinal sliding movement in the crossbars 24 and 25 and are normally urged toward the front of the machine by means of compression springs 110 located on the forward ends of the rods. Each rod is provided at its rear end with a shifting fork 111 and 112 which forks engage between suitable flanges provided on the elements 95 and 101. The push rods 108 and 109 are adapted to be moved rearwardly so as to cause engagement of one or the other of the shift clutches by means of arms 113 and 114 which are arranged to bear against the forward ends of the push rods. As shown in Fig. 1, the arm 113 is secured to a sleeve 115 which is loosely journalled on a transverse shaft 116 journalled in the framework of the machine. The arm 114 is similar to the arm 113 and is secured to the shaft 116. By means not disclosed herein, but fully shown and described in Patent No. 2,327,-635, depression of the left shift key causes the shaft 116 to be rocked counter-clockwise as viewed in Fig. 1, thereby causing the push rod 109 to be moved rearwardly thereby establishing a driving connection from the power shaft 45 to the gear sleeve 103. In a similar manner the sleeve 115 is adapted to be rocked counter-clockwise upon depression of the right shift key so as to cause rearward movement of the push rod 108 so as to connect the gear sleeve 97 with the power drive. As fully disclosed in the previously mentioned patent, the gear sleeve 103 is connected by suitable gearing with a shift gear 120 which carries a pair of shift pins 121 which are adapted to engage with notches formed in a shift rack 122 (Fig. 1) mounted on the rear of the carriage. The gear sleeve 97 is likewise connected with the shift gear 120 through suitable gearing but also employs a wide idler gear 123 (Fig. 1) for causing the shift gear to be driven in a reverse direction.

It will be understood from the foregoing description that the right and left shift keys and the associated shift mechanism related thereto provide means for shifting the carriage selectively in either direction from one ordinal position to another. If either of the shift keys be maintained in their depressed position for more than one cycle of operation of the machine, the shifting operation will be continuous through a number of ordinal positions corresponding to the number of cycles for which the key is held down. Shifting movements of the carriage are also adapted to be controlled automatically during division operations through an auxiliary mechanism which will be described hereinafter.

*Extended tens-transfer mechanism*

In the present machine provision has been made for effecting a tens-transfer from one order of the accumulator to the next throughout the entire capacity of the accumulator. This is accomplished by providing an auxiliary or outboard transfer mechanism which is brought into play with respect to the accumulator numeral wheels which lie to the left of the regular transfer mechanism of the machine. This auxiliary transfer mechanism is normally disabled and is rendered effective only in the event of a transfer occurring in the highest order controlled by the regular transfer mechanism of the machine. Also, this mechanism is capable of being disabled order by order as the outboard numeral wheels are shifted inboard so as to cause the outboard transfer mechanism to become active only with respect to those orders of the accumulator lying to the left of the regular or inboard transfer mechanism of the machine. This auxiliary transfer mechanism is of the simultaneous type and is controlled for plus or minus operations by the add-subtract gate of the calculating machine.

The auxiliary transfer mechanism herein shown and described is identical with that shown in Patent No. 2,403,069, issued to Carl M. Friden et al. on July 2, 1946, and reference is made to this patent for a detailed description of the complete mechanism.

Figure 3:
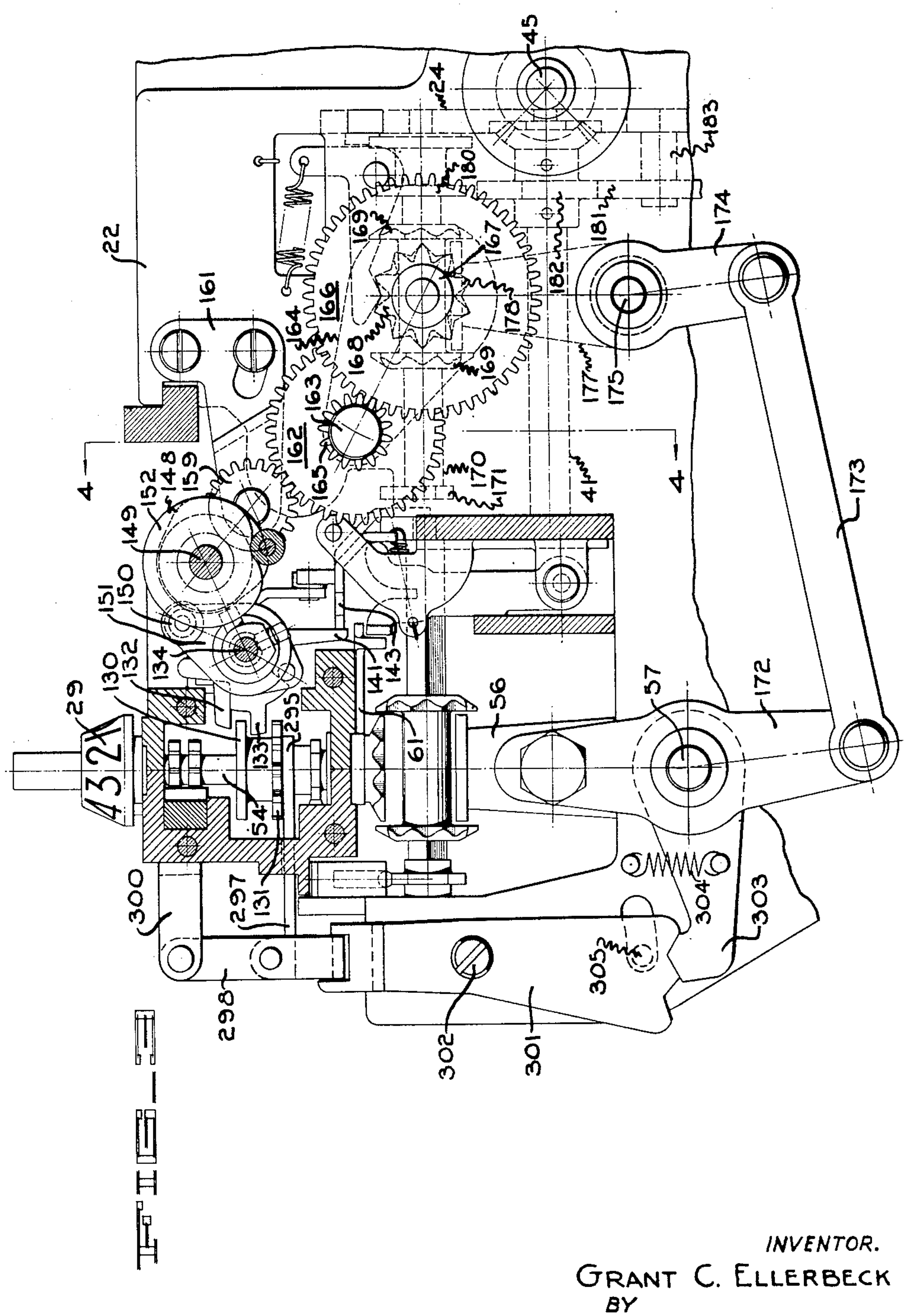
Fig. 3 is a longitudinal cross-sectional view illustrating certain parts of the extended tens-carry mechanism.

As shown in Fig. 3, each accumulator wheel shaft 54 lying beyond the regular transfer mechanism of the machine is provided with a sensing disc 130 and a tens-transfer actuating gear 131. The disc 130 is adapted to be sensed by a sensing finger 132 which is arranged to control an actuating tooth 133 cooperating with the gear 131 in the next higher order of the accumulator. The finger 132 and tooth 133 form a part of an actuator assembly which is supported on an actuator shaft 134 journalled between the left-hand end plate 135 (see Fig. 4) of the carriage and a bracket 136 mounted on the framework of the carriage. The shaft 134 is adapted to receive endwise shifting movement and also rotary oscillatory movement by means of a mechanism later to be described and is arranged to impart these movements to the sensing fingers 132 and the actuating teeth 133 of the actuator assembly in a manner similar to that fully described in the aforementioned patent.

Figure 4:
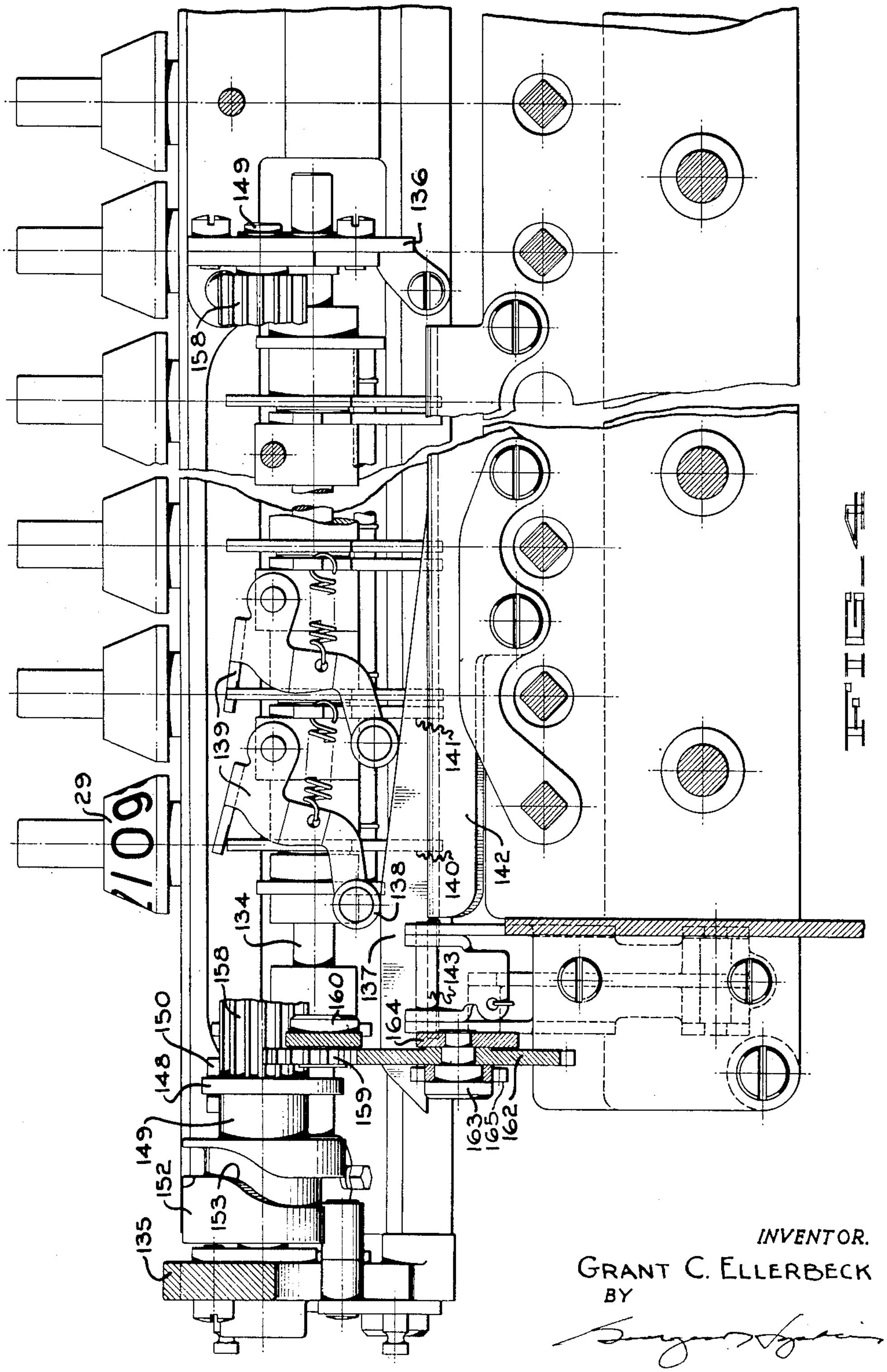
Fig. 4 is a transverse sectional elevation taken along the line 4—4 in Fig. 3.

As the carriage moves toward the right, as viewed in Fig. 4, additional orders of the accumulator will be moved inboard and means is provided for disabling the auxiliary transfer mechanism in each order as it comes within the range of the regular transfer mechanism of the machine. This means includes a camming rail 137 mounted on the framework of the machine which is adapted to engage with rolls 138 carried by pivoted coupling members 139 so as to uncouple the actuating teeth from the sensing fingers as the accumulator wheels are moved inboard. The actuator teeth and sensing fingers are also provided with depending tails 140 and 141 respectively, which, as they pass inboard, move behind the edge of a fixed rail 142 so as to restrain the operation of these parts in their inboard positions.

Means is also provided for preventing operation of the outboard or auxiliary transfer mechanism except when a tens-transfer occurs in the highest order of the accumulator. This means comprising a tiltable blocking member 143 which lies in the plane of the rail 142 and immediately to the left thereof, as seen in Fig. 4, so as to engage the tail 140 of the actuating tooth associated with the lowest outboard order thereby disabling all higher orders of the auxiliary transfer mechanism. As shown in Fig. 3, the member 143 is adapted to be tilted to an ineffective position whenever the highest inboard transfer lever 61 is actuated so as to enable the auxiliary transfer mechanism for the outboard orders to function to effect any required tens-transfer operation therein.

Oscillatory movement of the shaft 134 is effected by means of a cam 148 mounted on a cam shaft 149 journalled between the end plate 135 and the bracket 136. Engaging with the cam 148 is a grooved roller 150 slidably and rotatably mounted on a pin which is mounted on an arm 151 secured to the shaft 134.

Reciprocatory movement of the shaft 149 is effected by a drum cam 152 (Fig. 4) mounted on the left-hand end of shaft 149, this cam having a sinuous groove 153 formed therein which is engaged by a pin (Fig. 3) secured to the shaft 134. This pin normally lies midway along one of the inclined portions of the groove 153 so that upon rotation of the cam shaft 149 in either direction the actuator shaft 134 is first shifted endwise one-half step in one direction or the other, after which the shaft is rocked by cam 148 during the dwell provided in the groove 153. The actuator shaft 134 is then shifted longitudinally a full step in the opposite direction so as to provide an actuating stroke for the actuating teeth 133, after which the shaft is rocked by the cam 148 so as to disengage the actuator teeth from the gears 131. The shaft 134 is then shifted one-half step in a longitudinal direction so as to return this shaft to its starting position.

The cam shaft 149 carries a long pinion 158 (Fig. 4) which is engaged by a small gear 159 journalled on a stud 160 supported on a bracket 161 (Fig. 3) attached to the left side frame 22. Gear 159 meshes with a large gear 162 which is journalled on a stud 163 carried by a bracket 164 which is attached to the left side frame. Secured to the gear 162 is a small gear 165 which meshes with a large gear 166 fastened on the left-hand end of a stub shaft 167 which is journalled in a bushing mounted in the left side frame 22. Secured to the right-hand end of the shaft 167 is a ten tooth gear 168 which is adapted to engage with one or the other of a pair of ten tooth gears 169 mounted on either end of a sleeve which is slidably but non-rotatably mounted on a square shaft 170 which is journalled at its forward end in the crossbar 24 and at its rear end in a bracket 171 fastened to the framework of the machine. The selective engagement of one or the other is controlled from the gate shaft 57 by means of an arm 172 mounted on the left-hand end of this shaft, which arm is connected by a link 173 with the lower end of an arm 174 secured to a shaft 175 journalled between the left side frame 22 and a bracket 176 (Fig. 2) supported on the crossbar 24. Secured to the right-hand end of the shaft 175 is an arm 177 which, at its upper end, carries a strap 178 which lies between the gears 169. Hence, whenever the gate shaft 57 is rocked so as to condition the machine for addition or subtraction, one or the other of the gears 169 will be engaged with the gear 168 so as to cause rotation of the cam shaft 149 in the appropriate direction.

Secured to the forward end of the square shaft 170 (Fig. 3) is a gear 180 which is adapted to be operated by a pawl 181 (see also Fig. 2) which is apertured to receive an eccentric 182 secured to the forward end of the leftmost actuator shaft 41. The lower end of the pawl 181 is provided with a slot which engages with a stud 183 mounted on the crossbar 24. Hence, for each operation of the transverse power shaft 45, the pawl 181 will be given one complete cycle of movement whereby a tooth 184 (Fig. 2) formed on the upper end of the pawl 181 will engage with the teeth of the ten tooth gear 180 and hence rotate the shaft 170 through one-tenth of a revolution. In the event the gears 169 are shifted, from the rocking of the plus-minus gate 55 and linkage 172, 173, 174, a similar rotation of shaft 167 and gear 166 will be accomplished. The gear ratio between the shaft 167 and the cam shaft 149 is such that for each one-tenth revolution of the shaft 167 the cam shaft will receive one complete rotation. Hence, on each cycle of the machine the actuating teeth 133 will be given one complete operation thereby causing any required transfers in the outboard orders of the accumulator to be effected.

*Division control mechanism*

In the present machine, mechanism is provided whereby a dividend set up on the accumulator wheels 29 may be automatically divided by the method of successive subtraction by a divisor set up on the amount keys 35. As hereinbefore stated, this mechanism is similar to the mechanism shown in Patent No. 2,327,981 and accordingly, only so much of this mechanism will be described as is necessary for a complete understanding of the present invention.

The division control mechanism operates to control the functioning of the machine so as to cause the divisor to be repeatedly subtracted from the dividend until an overdraft occurs in the accumulator whereupon, the divisor is added back into the accumulator so as to correct the overdraft and the carriage is then shifted one ordinal space to the left, after which the process is repeated. The number of subtraction cycles effected in each order is registered in the revolutions counter so as to provide a representation of the quotient at the end of the division operation. During division problems the machine is controlled by a program control device which becomes effective each time an overdraft occurs in the accumulator to program the operation of the add-subtract mechanism and also the carriage shift mechanism so as to cause the proper sequential operation of these mechanisms during uninterrupted, cyclic operation of the machine. The machine is conditioned for division by the depression of a division key which causes the program control device to be operatively connected with the add-subtract gate and the carriage shift mechanism and renders the overdraft control mechanism effective to control the cycling of the programming device.

Figures 6, 14:
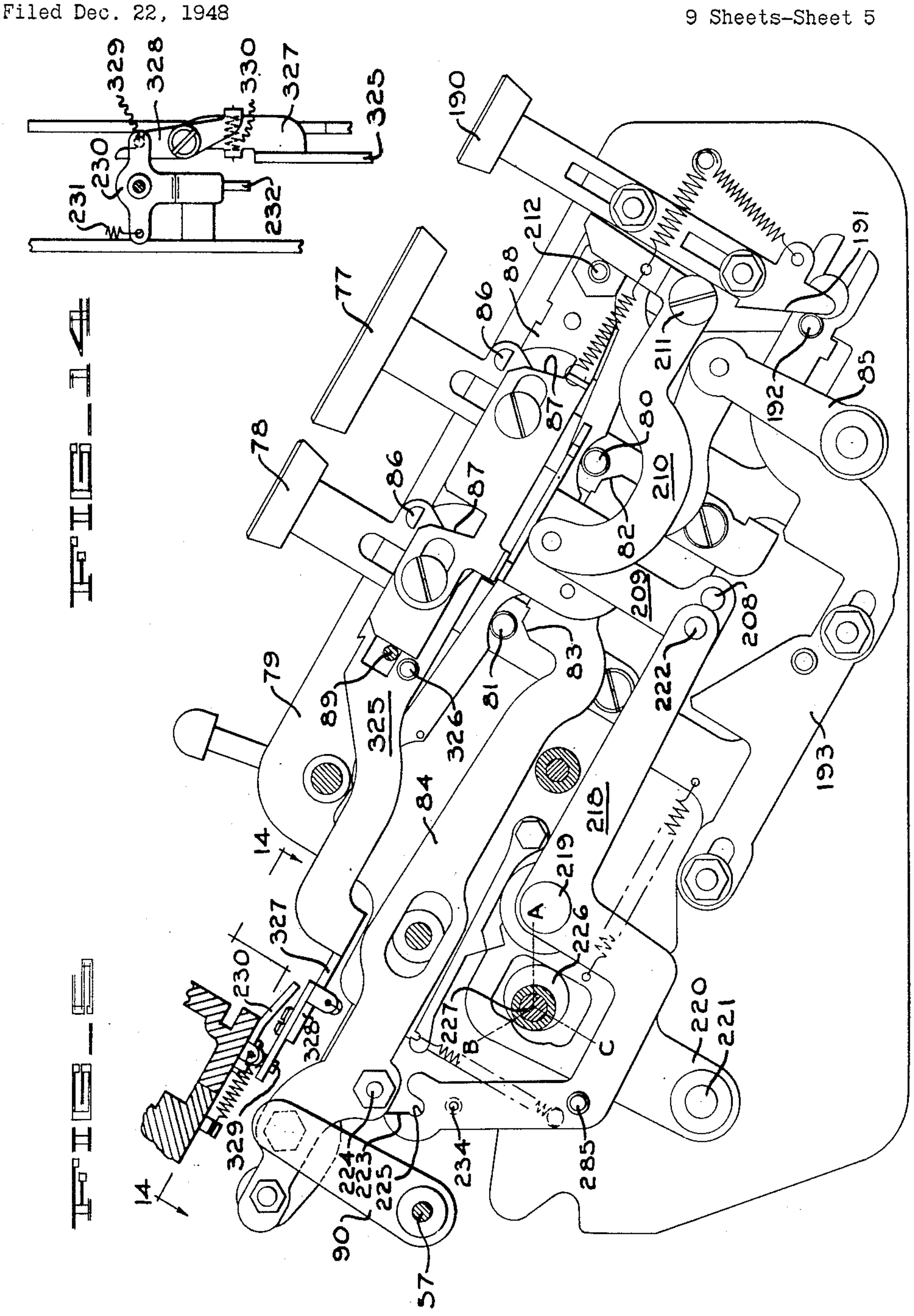
Fig. 6 is a view showing the mechanism mounted on the right-hand side of the control plate.
Fig. 14 is a detail view taken along the line 14—14 in Fig. 5.

As shown in Fig. 5, a division key 190 is mounted for sliding movement on the control plate 179 and is provided on its lower end with an inclined cam face 191 which bears against a roll 192 mounted on a division release slide 193. Referring to Fig. 6 of the drawings, it will be seen that the slide 193 carries a roll 194 which lies in front of a finger 195 on a latch 196 pivotally mounted on a stud 197 secured to the control plate 79. The latch 196 is normally urged counter-clockwise by a spring 198 so as to maintain a shoulder formed thereon beneath a stud 199 mounted in the forward end of an arm 200 which is pivoted on a stud 201 fastened to the control plate 79. The arm 200 is biased in a counter-clockwise direction by means of a heavy spring 202 which serves to set or actuate the division control mechanism when the arm 200 is released by the latch 196. As shown in Fig. 5, when the division key 190 is depressed, the inclined cam face 191 will cause the slide 193 to be moved rearward whereby the roll 194 will rock the latch 196 (Fig. 6) clockwise thereby releasing the actuating arm 200 for operation so as to cause setting of the division control mechanism.

The arm 200 is arranged to be restored during the first cycle of operation of the machine by means of a pin 205 mounted on the face of a gear 206 which is fastened on the right-hand end of the power shaft 45. The pin 205 is designed to cooperate with an inclined surface formed on the upper end of an arm 207 which is integral with the arm 200.

Means is also provided for causing the clutch to be engaged and the motor contacts to be closed simultaneously with the release of the arm 200 from the latch 196. For this purpose a roll 208 (see also Fig. 5) bears against the underside of the arm 200 so that when the latch 196 is released the roll 208 will be forced downwardly. The roll 208 is mounted on the lower end of a link 209 which is pivotally connected at its upper end to one arm of a bell-crank lever 210 which is pivoted on a screw 211 fastened to the control plate 79. The bellcrack lever has an upstanding arm which lies in front of a pin 212 on the forward end of the cycle initiating slide 88. As previously described, the slide 88 cooperates with the pin 89 to cause the motor contacts to be closed and the clutch to be engaged so as to cause cycling of the machine.

As previously indicated herein, means is provided for operatively connecting the add-subtract gate with the program controlling device and for this purpose a connecting lever 218 is provided. As shown in Fig. 5, the lever 218 is pivoted at 219 on a cam follower arm 220 which is pivotally mounted on a stud 221 secured to the control plate 79. The forward end of the lever 218 is pivotally connected at 222 to the lower end of the link 209 so that when this link is moved down following the depression of the division key 190, the rear end of the lever 218 will be moved upwardly so as to cause an inclined surface 223 formed thereon to engage with a pin 224 mounted on the control slide 84. The control slide will thereby be moved forwardly so as to cause the subtract gears 52 to be engaged with the gears 53 thereby conditioning the machine for subtraction. At the completion of the rocking movement of the lever 218, the pin 224 will be seated in the bottom of the notch 225 provided in the rear end of the lever 218 thereby fully coupling the gate control slide 84 with the cam follower arm 200.

During division operations, when the program controlling device is active, the movement of the control slide 84, and thereby the add-subtract gears 51, 52, is controlled by a wide-faced cam 226 which is secured to a program control shaft 227. As shown in Fig. 2, the shaft 227 extends transversely across the width of the machine and is journalled in the left side frame 22, the right side frame 23 and the control plate 79.

By means later to be described herein, the shaft 227 is adapted to be given three steps of movement at the end of each cycle of operation of the machine following the advent of an overdraft in the accumulator. As shown in Fig. 5, when the shaft 227 and cam 226 are in the positiond esignated by the line marked A, the connecting lever 218 will be located in its forward position where the subtract gears 52 will be engaged with the gears 53. At the end of the machine cycle in which an overdraft occurs, the shaft 227 will be rotated one-third of a revolution to the position marked B so as to cause the lever 218 to be moved rearwardly and thereby cause the add gears 51 to be engaged with the gears 53. The divisor will thereby be added back into the accumulator so as to correct the overdraft and at the end of this cycle the shaft 227 will be rotated through a one-third of a revolution to the position marked C so as to move the connecting lever 218 to an intermediate or neutral position where the add-subtract gears 51, 52 will be disengaged from the gears 53 and at the same time the carriage shift mechanism will be rendered operative so as to cause shifting of the carriage through one ordinal space. At the end of the carriage shift cycle, the shaft 227 will again be rotated through one-third of a revolution so as to return the cam 226 to the position marked A. The machine will thereby once again be set for subtraction so as to cause the divisor to be repeatedly subtracted from the dividend until an overdraft again occurs whereupon the program control shaft 227 will once more be rendered active to control the machine through three cycles of operation in the manner indicated above.

This process will be repeated until the carriage reaches its end position whereupon the division operation will be terminated and the machine will come to rest with the quotient appearing on the revolutions counter wheels 30.

*Automatic division stop*

Figure 13:
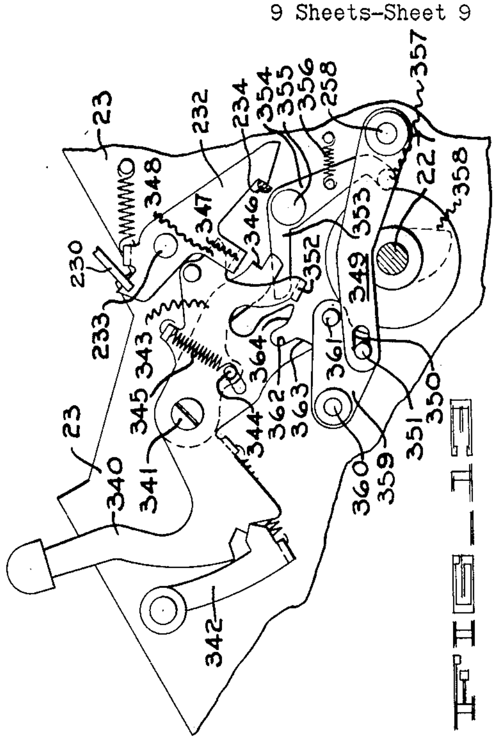
Fig. 13 is a fragmentary view showing the means for preventing the termination of a division operation while the factors are being aligned.
Figure 11:
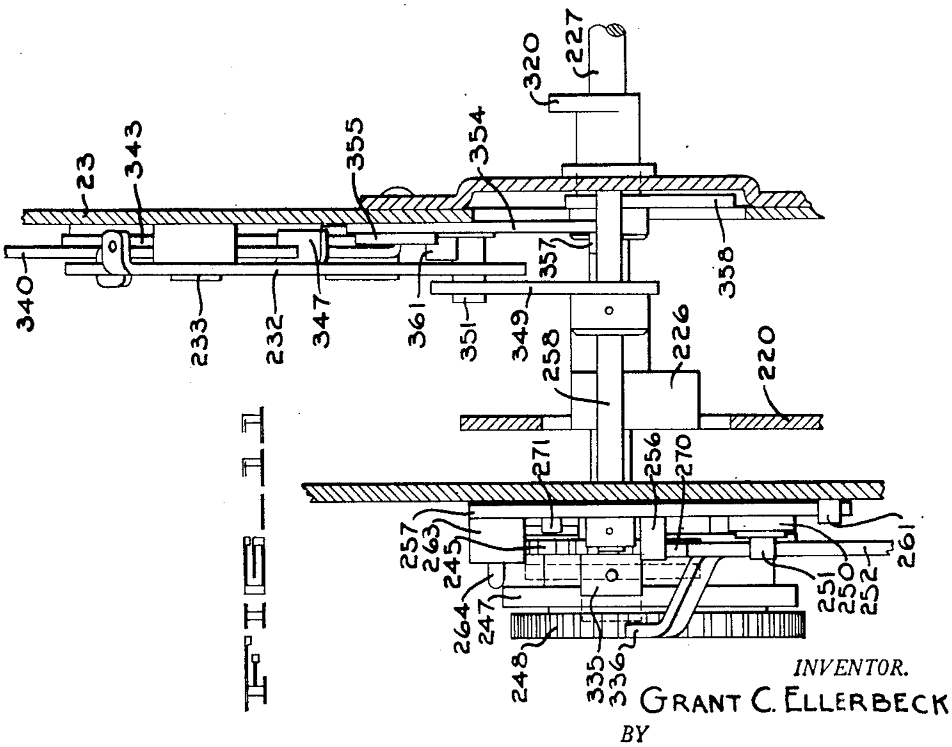

As indicated above, the division operation will be automatically concluded when the carriage reaches its left end position, and for this purpose a pawl 230 (see Figs. 5, 13 and 14) is pivotally mounted in the framework of the carriage and is normally urged clockwise as viewed in Fig. 14 by means of a suitable tension spring 231. This pawl is adapted to cooperate with the upper end of a latch 232 (see Figs. 13 and 14) which is pivoted at 233 on the right side frame 23. The lower end of the latch 232 is provided with a shoulder which is adapted to engage with a half-round stud 234 (see also Fig. 5) carried by the connecting lever 218 so as to cause this lever to be held in its rocked position throughout the division operation. When the carriage shifts into its left end position the upper end of the latch 232 will contact the left-hand edge of the pawl 230 (Fig. 13) and thereby rock the pawl counterclockwise as viewed in Fig. 14 against the tension of the spring 231. Following the shift cycle, the machine will again be set for subtraction until an overdraft occurs whereupon the connecting lever 218 will be moved rearwardly for the add-back cycle. The upper end of the latch 232 will thereby be moved forward whereupon the spring 231 (Fig. 14) will rock the pawl 230 clockwise so as to move the forward end thereof to the position shown in Fig. 14 in which it is behind the latch 232. At the end of the add-back cycle the connecting lever will be moved forward so as to move the gate to its neutral position and, inasmuch as the upper end of the latch 232 is held against rearward movement by the pawl 230, as shown in Fig. 13, the stud 234 will move forward off of the shoulder on the latch thereby permitting the connecting lever 218 to drop to its inactive position. The cycle initiating slide 88 (Fig. 5) will thus be released whereupon it will move forwardly thereby breaking the motor circuit and disengaging the clutch.

*Revolutions counter reversing mechanism*

In order to cause the subtraction cycles of the machine to be counted in a positive sense during division operations, it is necessary that the revolutions counter be operated in a reverse direction, and for this purpose a counter reversing key 238 (Fig. 6) is mounted on the control plate 79 so as to lie beside the division key 190. The key 238 is arranged to operate a counter reversing mechanism indicated generally at 239 so that when the key 238 is depressed along with the division key 190, a positive registration of the quotient will be caused to appear in the counter wheels 30. The counter reversing mechanism 239 and the means by which it is controlled by the key 238 is fully shown and described in U. S. Patent No. 2,294,111, issued to Carl M. F. Friden on August 25, 1942, and reference is made to this patent for a disclosure of this part of the machine.

*Division aligner mechanism*

In order to cause the dividend and divisor factors to be brought into alignment with one another at the beginning of a division operation means is provided in the machine presently being described for causing the carriage to be shifted toward the right until the factors are brought into alignment, after which the machine will proceed to automatically divide the dividend by the divisor. The novel mechanism hereinafter to be described for causing the dividend and divisor to be automatically aligned upon depression of the division key makes use of the previously described program control device for causing the carriage to be shifted to the right until the factors are aligned. The right shift operation is then terminated and the machine conditioned for an automatic division operation with left-hand shifting of the carriage.

In order to condition the program control mechanism so as to cause right-hand shifting of the carriage at the outset of the division operation the program control shaft 227 is arranged to be shifted axially from a neutral or inactive position to a left-hand position in which it will cause right-hand shifting of the carriage during each cyclic operation of the control shaft. The shaft 227 will remain in this position until the factors are properly aligned whereupon it will automatically be shifted axially to the right to a right-hand position in which it will control functioning of the machine in the normal manner for a division operation. As shown in Figs. 2, 6, 9, 11 and 12, the program control shaft 227 is provided on its right-hand end with a mutilated gear 245 which is similar in every respect to the mutilated gear shown and described in Patent No. 2,327,981. When the machine is at rest and the parts are in the positions which they normally occupy prior to the outset of a division operation, the mutilated gear 245 normally lies in an intermediate position as indicated by full lines in Fig. 2 and by dotted lines in Fig. 11. When the gear is in this position it lies between two spaced-apart, larger mutilated gears 246 and 247, each of which corresponds to the larger mutilated gear shown and described in the above-mentioned patent. These gears are each provided with a single set of two teeth which are arranged to cooperate with the three sets of three teeth each provided on the mutilated gear 245 so as to effect an intermittent drive of this gear and of the control shaft 227. The gears 246 and 247 are secured to one another and also to a conventional type of gear 248 and the entire assembly is journalled on a screw 249 secured to the control plate 79. The gear 248 meshes with the gear 206 secured to the right-hand end of the power shaft 45 thereby providing a driving connection from the power shaft to the gears 246 and 247.

When a division operation is initiated by depression of the division key 190, a link 250 which is pivotally connected at its forward end to the arm 207 (Fig. 6) and guided at its rear end by a pin and slot connection 244 will be moved forwardly and will cause a pin 251 mounted on the link to rock an arm 252 pivoted on the control plate at 253 counter-clockwise against the action of a spring 254. The arm 252 is provided with a camming face 255 which lies beneath a pin 256 mounted on a lever 257. The lever 257 is secured to the left-hand end of a shaft 258 journalled between the control plate and the right side frame 23 and is normally held in the position shown in Fig. 6 by means of a spring 259 which resiliently holds a tail 260 of the lever in contact with a stud 261 on the control plate. The lever 257 is also provided with a forwardly extending arm 262 which carries a block or pad 263 on which is mounted a pin 264. In the normal position of the parts as shown in Figs. 2 and 6, the pin 264 lies within a notch provided in the mutilated gear 245 and thereby locates the gear in its home position. The mutilated gear is also resiliently held in any one of its moved positions by means of a leaf spring 265 fastened to the control plate.

Figure 12:
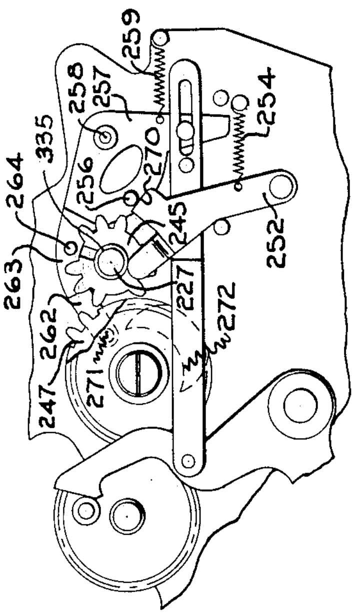
Fig. 12 is a fragmentary view similar to Fig. 9 but showing the parts in different positions.

When the link 250 moves to the left, as viewed in Fig. 6, the arm 252 will be rocked counter-clockwise so as to cause the pin 256 to be cammed upwardly where it will be held by a surface 270 provided on the arm 252. The parts will thereby be positioned as shown in Fig. 12 with the pin 264 disengaged from the notch in the mutilated pinion.

On the forward end of the arm 262 is a pin 271 which is adapted to cooperate with a crescent-shaped cam 272 fastened to the inner face of the gear 246. When the lever 257 is in its normal position, as shown in Fig. 6, the cam 272 will by-pass the pin 271, but when the lever has been elevated to the position shown in Fig. 12 the pin will be engaged by the outer periphery of the cam thereby causing the lever 257 to be rocked to the position shown in Fig. 9. The pad 263 on the lever is thereby moved out from behind the mutilated gear thereby permitting the shaft 227 to be shifted to the left under the influence of a compression spring 275 (Fig. 2) located on the left-hand end of the shaft. The mutilated gear 245 will thereby be brought into the plane of the larger mutilated gear 246 so as to initiate cyclic operation of the control shaft 227.

The lifting of the arm 262 into the position shown in Fig. 9 also raises the stud 256 off of the face 270 thereby allowing the spring 254 to restore the arm 252 to the position shown in Figs. 6 and 9 where the arm is once again held in contact with the pin 251 on the link 250. At the time that the arm 252 is released by the pin 256, the link 250 will have been restored to its original position due to the restoration of the actuating arm 200 by the pin 205 on the gear 206 (Fig. 6). Once the mutilated gear has been shifted to the left in the manner described, the pad 263 on the lever 257 will be prevented from again engaging behind the gear upon release of the pin 271 by the cam 272, the lever being merely permitted to move down until a curved portion 276 of the pad rides on the outer ends of the gear teeth on the mutilated gear.

Figure 11:
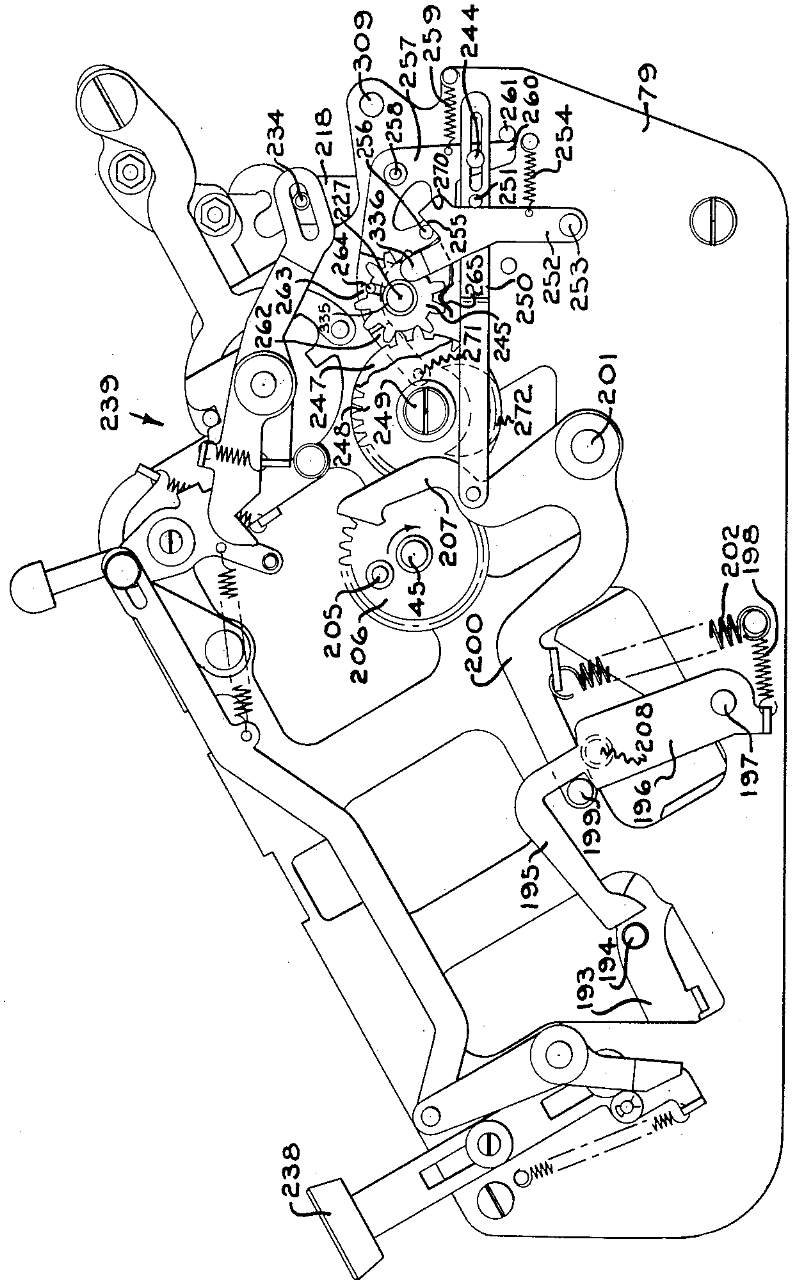
Fig. 11 is a fragmentary cross-sectional view showing certain details of the modified program control mechanism.

As shown in Fig. 11, the cam 226 is of sufficient width that it will always remain engaged with the aperture in the follower arm 220 during axial shifting movements of the shaft 227.

Right-hand shifting movement of the carriage is effected under the control of the shaft 227 by means of a cam 277 (Fig. 2) secured to this shaft which is adapted to cooperate with an arm 278 secured to a hub 279 freely rotatable on a shaft 280 journalled between the right side frame 23 and a bracket 281 secured to the supporting bar 42. Also secured to the hub 279 is a shifter arm 282 which is adapted to cooperate with the right shift fork 111 and cause this fork to be moved rearwardly when the shifter arm is rocked clockwise as viewed from the right-hand side of the machine. The assembly consisting of the arms 278 and 282 and the hub 279 is held against endwise movement on the shaft 280 by a pair of collars 283 which are pinned to the shaft.

Secured to the connecting lever 218 is a long pin 285 (Figs. 2 and 5) which extends through an aperture in the right side frame 23 and lies beneath the forwardly extending arm of a bellcrank lever 286 which is pivoted at 287 on a bracket 288 fastened to the right side frame. The lever 286 is provided with an upwardly extending shifting arm 289 which engages between a pair of spaced flanges formed on a hub 290 secured to the right-hand end of a shaft 280. Consequently, when the connecting lever is rocked clockwise as viewed in Fig. 5 upon depression of the division key 190, the pin 285 will rock the bellcrank 286 counter-clockwise as viewed from the front of the machine thereby causing the shifting arm 289 to move the shaft 280 laterally against the force exerted by a compression spring 291 mounted on the left-hand end of the shaft. This will cause the follower arm 278 to be moved to the left where it will lie out of the path of the shift cam 277 when the program control shaft 227 is in its intermediate position with the mutilated gear lying midway between the gears 246 and 247, as shown in Fig. 2. However, when the mutilated gear is released by the arm 257 for left-hand movement under the influence of the compression spring 275, the cam 277 will be shifted to the left and once more be brought into alignment with the follower arm 278. Hence, when the control shaft 227 is rotated to the position indicated at C in Fig. 5, the cam 277 will be rotated into position to rock the arm 278 clockwise as viewed from the right side of the machine and to hold it in this position during the shift cycle. The shifter arm 282 will also be held rocked during the shift cycle so as to cause the right shift clutch to be maintained operative and hence cause the carriage to be shifted one space to the right.

So long as the mutilated gear lies in the plane of the larger mutilated gear 246, the program control shaft 227 will be continuously cycled so as to cause the machine to be given an add-back cycle followed by a shift cycle during which the carriage is moved one space to the right. The shift cycle will in turn be followed by a subtract cycle during which the divisor will be subtracted from the dividend. This sequence of operations will be continued until an overdraft occurs in the accumulator thereby indicating that the carriage has been shifted sufficiently far to the right to bring the dividend and divisor into proper alignment for division. Mechanism is then brought into play for causing the machine to operate through an automatic division operation in the normal manner.

Figures 7, 8:
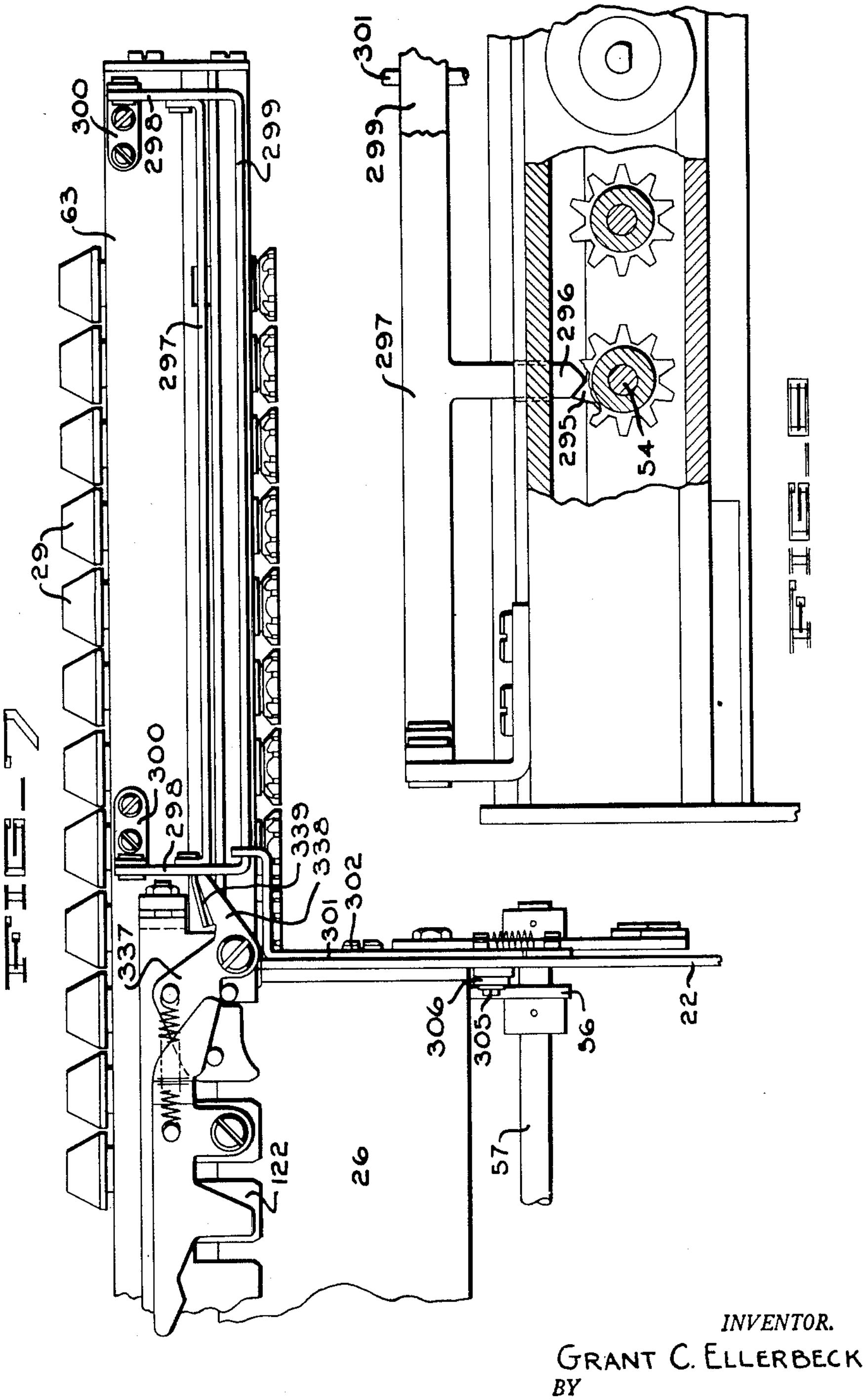
Fig. 7 is a rear view of a portion of the machine showing the means whereby the machine is controlled in division operations from the highest order numeral wheel of the accumulator.
Fig. 8 is a fragmentary plan view showing in greater detail a portion of the mechanism illustrated in Fig. 7.
Figure 14:
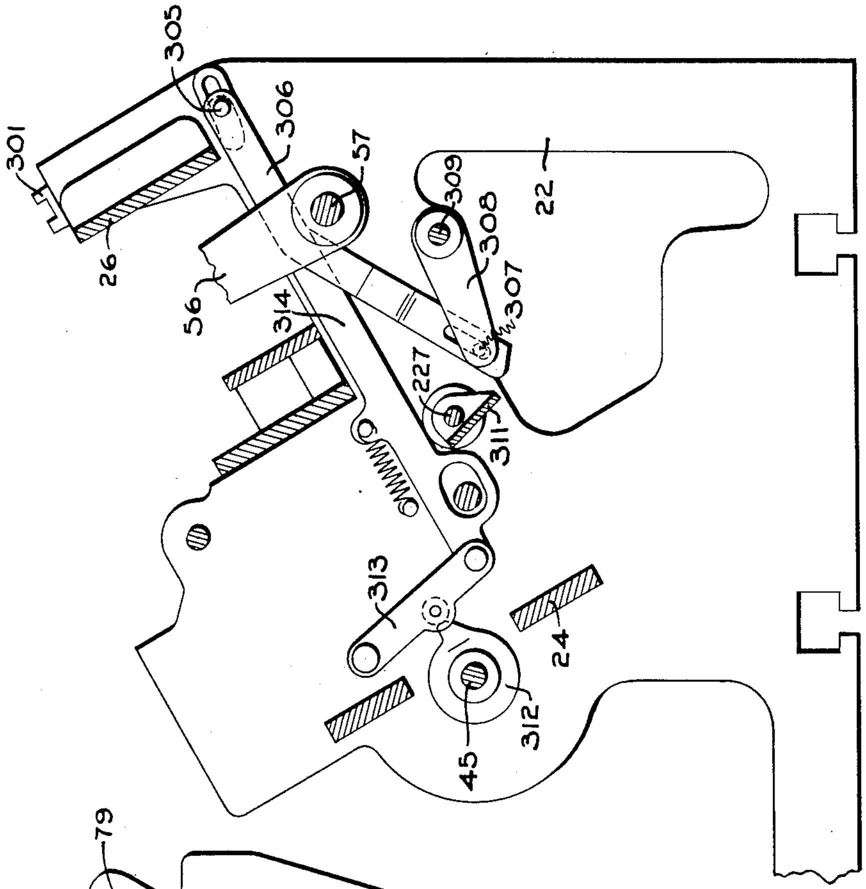
Figure 15:
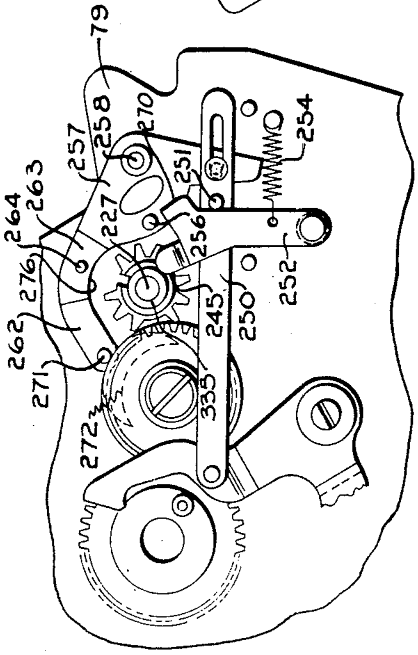

As shown in Fig. 8, the highest order accumulator wheel shaft 54 is provided with a cam 295 which is arranged to cooperate with a tooth 296 formed on a bar 297. The bar 297 is fastened at either end to the side arms 298 of a bail 299 which is pivotally supported at either end on brackets 300 which are secured to the crossbar 63 of the carriage frame. The bail 299 is engaged by the notched end of a lever 301 (see also Fig. 3) which is pivotally mounted on a screw 302 fastened to the left side plate 22. The arm 301 is arranged to be retained in either of two positions by a detent lever 303 which is pivoted on the gate shaft 57 and urged into engagement with one or the other of two notches provided on the lower end of the lever 301 by means of a spring 304. The lever 301 carries a pin 305 which passes through an aperture provided in the left side frame and has pivotally secured thereto an overdraft control link 306 (see also Fig. 10) which is supported at its forward end by a pin 307 which engages with an elongated slot provided in the link. The pin 307 is carried by an arm 308 which is secured to a transverse shaft 309 (Fig. 2) which is journalled between the left side frame 22 and the control plate 79. At its right-hand end the shaft 309 has secured thereto an arm 310 the forward end of which lies above the pin 285 on the connecting lever 218. Hence, when the rear end of the connecting lever is elevated upon the initiation of a division operation, the shaft 309 will be rocked clockwise as viewed from the right side of the machine thereby causing the pin 307 (Fig. 10) to lift the forward end of the link 306 to a position where it will lie behind an overdraft control flag 311 which is shaped in the form of a bail and loosely pivoted on the control shaft 227 (see also Fig. 2). Hence, after the carriage has been shifted sufficiently far to the right to cause an overdraft in the accumulator when the divisor is subtracted from the dividend, the cam 295 on the highest order numeral wheel shaft (Fig. 8) will engage with the tooth 296 as the wheel moves from 0–9 thereby rocking the bail 299 rearwardly so as to cause the pin 305 and the overdraft control link 306 (Fig. 10) to be moved forward and cause the flag 311 to be rocked clockwise as viewed in Fig. 10. At the end of the cycle in which the overdraft occurred, the control link 306 and the lever 301 will be restored to their normal positions by means of a cam 312 secured on the left-hand end of the transverse power shaft 45. As shown in Fig. 10, this cam is provided with a nose which is adapted to cooperate with a roll on an arm 313 which is provided on the left side frame 22. The lower end of the arm 313 is pivotally connected to the forward end of a link 314 which is provided at its rear end with an elongated slot which engages over the stud 305. Hence, shortly after the control link 306 has been moved forward near the end of a subtraction cycle, the nose on the cam 312 will contact the roll on the arm 313 and force the link 306 and the lower end of lever 301 rearwardly where they will be retained by the spring-urged detent 303. The forward movement of the overdraft control link 306 and resulting clockwise rocking of the flag 311, effected by an overdraft as described above, will bring an upstanding finger 315 (see Figs. 1 and 2) on the flag into the path of a pin 316 provided on the forward face of a disc 317 secured to the leftmost actuator shaft 41. The pin 316 will engage with the finger 315 near the end of the cycle in which the overdraft occurred so as to shift the flag toward the right. This will cause the control shaft 227 to be likewise shifted to the right, by virtue of a collar 318 secured to the shaft 227, displacing the cam 277 from operative relation with the right shift follower arm 278. The rightward shifting of the shaft 227 will also cause the mutilated gear 245 to be brought into the plane of the larger mutilated gear 247 so as to cooperate with the single set of three teeth thereon. These teeth will cooperate with the mutilated gear 245 at the very end of the overdraft cycle and cause the control shaft 227 to be rotated through one-third of a revolution so as to condition the machine for addition. At the end of the addition cycle the control shaft 227 will receive another 120 degrees of rotation so as to condition the machine for a left shift operation which is accomplished in the machine presently being described by means of a shift cam 320 secured to the control shaft 227 which is brought into the plane of a follower arm 321 when the shaft is shifted to the right. The follower arm 321 is secured to the hub 290 so that when the arm is rocked clockwise by the cam, the shaft 280 will likewise be rocked in the same direction. Secured to the shaft 280 is a left shifter arm 322, the rear end of which bears against the left shift fork 112. Hence, when the arm 322 is rocked clockwise the left shift clutch will be engaged and cause the carriage to be shifted one ordinal space to the left.

When the control shaft 227 and the mutilated gear 245 are shifted to their right-hand positions by the flag 311, the gear will be moved out from beneath the pad 263 on the lever 257 thereby permitting the lever to be rocked counter-clockwise by the spring 259 into the position shown in Fig. 6. This will occur near the end of the machine cycle so that the cam 272 will lie in substantially the position shown in Fig. 6. The pin 264, however, will not be permitted to engage with the notch in the mutilated gear inasmuch as the gear has been shifted sufficiently far to the right that it lies beyond the end of the pin 264. After the mutilated gear has been rotated through one-third of a revolution and the flag 311 has been released by the pin 316, the spring 275 on the left-hand end of the control shaft 227 will urge the mutilated gear toward the left so as to bring the left-hand face of the gear against the end of the pin 264 and the gear will continue to ride on this pin until the control shaft has made one full revolution whereupon the notch in the gear will drop over the pin and the mutilated gear and control shaft will be moved by the spring 275 to the left into their intermediate positions, as shown in Fig. 2. At this time the machine will be conditioned for subtraction and the divisor will be repeatedly subtracted from the dividend until an overdraft again occurs in the accumulator whereupon the finger 315 on the flag will be moved into the path of the pin 316 so as to cause the control shaft to again be moved to the right for another cycle of operation during which time it will control the machine through an add-back cycle followed by a left shift cycle which in turn is followed by a subtraction setting of the add-subtract gate which setting will be maintained until an overdraft again occurs in the accumulator. This process will be continued until the carriage reaches its left end position whereupon the operation will be terminated by the pawl 230 mounted on the right-hand end of the carriage.

When the shaft 227 and mutilated gear 245 have been moved to the left to their intermediate positions, shown in Fig. 2 to condition the machine for repeated subtraction, the right shift cam 277 on the shaft 227 will not be moved into operative relation with the right shift follower arm 278, because the latter remains in its leftward displaced position under the control of the pin 285 on the connecting lever 218, and the bell crank 286. Hence, the repeated subtraction will take place while the right shift mechanism remains disabled.

In some instances, a division operation may be stopped before being completed, as for example by operation of manually controlled division stop mechanism, leaving the shaft 227 and the left shift cam 320 shifted to the right. In such cases it is necessary that, in the stopped positions of the parts, the left shift controlling cam 320 and the left shift follower arm 321 be in different planes so that no premature automatic shifting will take place in the next machine operation. This is provided for by so positioning the follower arm 321 on the shaft 280 that in the normal or non-actuated positions of all of the parts, except for the shaft 227 and cam 320 standing shifted to the right, the follower arm 321 is spaced to the right of the cam 320, even though the shaft 227 stands shifted to the right. However, the initial shifting of the shaft 280 and the follower arm 321 to the left, effected when the division key 190 is depressed, makes it possible for the rightward shifting of the shaft 227 to move the cam 320 into the plane of the follower arm 321.

Unless means were provided for disabling the pawl 230 (Figs. 5, 13 and 14) upon depression of the division key, it would be impossible to latch the connecting lever 218 in its rocked position due to the latch 232 being held disabled by the pawl 230. The means for disabling the pawl upon depression of the division key 190 consists of a slide 325 (Figs. 5 and 14) which bears a pin 326 lying behind the rear end of the cycle initiating slide 88. Hence, when the latter slide is moved toward the rear upon depression of the division key, the slide 325 will also be moved rearwardly. On the rear end of the slide 325 is mounted an extension 327 on which is pivotally mounted a pawl 328 which is provided at its rear end with a notch for engaging with a pin 329 carried by the pawl 230. The pawl 328 is normally urged to rotate in a clockwise direction as viewed in Fig. 14 by means of a spring 330 which is stretched between an ear on the pawl and an ear formed on the extension 327.

When the carriage approaches its extreme left hand position, while the slide 325 and pawl 328 are displaced rearwardly from the positions shown in Figs. 5 and 14, the pin 329 on the pawl 230 will engage the right hand face of the pawl 328 at a point between the pivotal mounting of the pawl 328 and the notch in this pawl. The pawl 328 will yield counterclockwise, as viewed in Fig. 14, due to the resiliency of the spring 330 and thus will not interfere with left shifting movement of the carriage and the pawl 230 to their extreme left hand positions. At this time the pawl 230 also will rock counterclockwise from its Fig. 14 position because of the front part of the pawl 230 engaging the right hand face of the latch lever 232, as shown in Fig. 13. The right hand face of the pawl 328, in front of the notch, will still be pressed against the pin 329, tending to prevent clockwise return rocking of the pawl 230. However, when the latch lever 232 is rocked counterclockwise as viewed in Fig. 13, incident to operation of the division stopping mechanism, the relatively strong spring 231 will rock the pawl 230 clockwise as viewed in Fig. 14 to position it behind the latch lever 232 as shown in Fig. 14 because the spring 231 is strong enough to overcome the relatively weak spring 330 which is then urging the right hand face of the pawl 328 in front of the notch, into contact with the pin 329, thus tending to prevent the pawl 230 from returning to its Fig. 14 position. When the operation stops, the slide 325 will be moved forwardly, and the spring 330 will move the pawl 328 to its Fig. 14 position wherein the pin 329 is received in the notch of the pawl 328. The machine will then be conditioned to be started when the slides 88 and 325 are displaced rearwardly.

At the end of division operations terminated by the automatic division stop means, the cycle controlled by the mutilated gear 245 has not been completed and the gear is not moved from registration with the gear 247. In order to prevent initiation of a division operation with the parts so relatively positioned, the mutilated gear is provided with a blocking part in the form of a hub 335 which will lie in the path of and will restrain a finger 336 formed on the upper end of the arm 252 when the mutilated gear is in this position. Hence, as shown in Fig. 6, the arm 252 will be blocked against counter-clockwise movement by the pin 251 on the link 250 thereby preventing movement of the actuator arm 200 under the influence of its spring 202. However, when the mutiliated gear is in its intermediate position, the finger 336 will be free to move past the end of the hub 335 thereby enabling the initiation of a division operation upon depression of the division key 190.

The setting of the divisor on the keyboard and the dividend in the numeral wheels may be such that the highest order numeral wheel will not be rotated through zero during the subtraction cycle with the carriage in its extreme right-hand position. In this case the divisor would be added back into the accumulator, the right shift clutch engaged though no further shifting could occur, and the divisor again subtracted from the same orders of the accumulator as before. Hence, the machine would, in effect, be stalled in its right end position and would continue cycling in this position until brought to a stop by the manual division stop lever hereinafter to be described.

In order to prevent this contingency from occurring, the conventional override pawl 337 (Fig. 7) mounted on the shift rack 122 (see Patent No. 2,327,635, supra) is provided with a camming tail 338 on which is formed an inclined lip 339. The end of the tail 338 lies immediately in front of the inboard side arm 298 of the bail 299 so that when the pawl is rocked clockwise as viewed in Fig. 7 by one of the shift pins 121 (Fig. 2), the lip 339 will engage the side arm and cam the bail 299 toward the rear of the machine. This will have the same effect as the rocking of the bail by the cam 295 on the highest order numeral wheel, i. e., the flag 311 will be thrown in and the mutilated gear shifted to the right so as to initiate a conventional division operation with left-hand shifting of the carriage.

*Manual division stop mechanism*

Manually operable mechanism, shown in Fig. 13, is provided for stopping the machine either at the end of a current cycle or following an add-back cycle phase during division. If the stop mechanism is operated when the machine is not dividing, the machine is first conditioned for one dividing cycle which is followed by stopping of the machine.

The mechanism shown includes a manually operable stop lever 340 pivoted as at 341 on the plate 23 so as to be rockable either clockwise, that is rearwardly of the machine, or counterclockwise, that is forwardly of the machine. A spring-urged detent 342 is provided for yieldingly retaining the stop lever 340 in its forward position. The lever 340 is formed with an inclined cam nose 348 normally overlying an ear 347 on the latch 232.

The parts of the stop mechanism thus far described may be operated to stop the machine at the end of a current cycle if the program control shaft 227 is not in its left-hand position for effecting rightward or aligning shifting of the carriage. When the shaft 227 is not in its left-hand position, the control shaft 258 is in its unactuated position, i. e. the position shown in Figs. 2, 6 and 13. In order to stop the machine, the lever 340 is rocked clockwise as viewed in Fig. 13, causing the cam nose 348 to press upon the ear 347 and deflect it rearwardly, thus rocking the latch 232 counterclockwise from its Fig. 13 position so as to release the pin 234 on the connecting lever 218, thus permitting the latter to be returned to its normal position and causing the machine to stop at the end of the current cycle.

Means is provided for preventing the lever 340 from being rocked clockwise when the shaft 227 is in its left-hand position and the control shaft 258 is in its actuated position as shown in Fig. 9. Referring to Fig. 13, the shaft 258 is fast with an arm 349 formed with a slot 350 which receives a pin 351 on another arm 359 pivoted as at 360 on the plate 23. The arm 359 is provided with a pin 361 adapted to be moved into a slot 362 in the lower end of the stop lever 340, the slot 362 being formed with inclined entrance portions 363 and 364 for guiding the pin 361 into the slot 362 when the arm 359 is rocked counterclockwise from its Fig. 13 position. When the shaft 258 is moved to its actuated position the arm 349 is rocked clockwise and, through the slot 350 and the pin 351, the arm 359 is rocked counterclockwise so as to move the pin 361 into the slot 362 at the bottom of the lever 340. The relative positions of the pivots 341 and 360, the slot 362 and the pin 361 will then be such that the arm 359 will block the stop lever 340 against clockwise rocking. However, if the program control shaft 227 is not in its left-hand position, the shaft 258 will be in its unactuated position as shown in Fig. 13, and the pin 361 will be clear of the slot 362, thus enabling the lever 340 to be rocked clockwise to stop the machine at the end of a current cycle in the manner described above.

Mechanism is provided for stopping the machine, not necessarily during a current cycle, but after the first add-back cycle following movement of the stop lever 340 forwardly, i. e. counterclockwise. As shown in Fig. 13 a pawl 343 is pivoted on the plate 23 as at 341 and is provided with a pin 344 which extends through a slot in the stop lever 340. A spring 345 interposed between an ear on the stop lever 340 and the pin 344 urges the pawl 343 counterclockwise so as normally to hold the pin 344 against the right end of the associated slot. The pawl 343 is formed with a shoulder 346 normally disposed below an ear 347 on the latch 232. The stop lever 340 is formed with an ear 352 underlying an arm 353 of a bell crank 354 pivoted at 355. The bell crank 354 has another arm equipped at its lower end with a conical pin 357. Normally, when the parts are in the positions shown in Fig. 13, the pin 357 is disposed radially or laterally beyond the path of a bevelled cam 358 on the program control shaft 227.

When a division operation is being performed the parts will be in the positions shown in Fig. 13, the pin 361 being clear of the slot 362 in the stop lever 340, and the program control shaft 227 being displaced to the right, so that the cam 358 will stand displaced axially from the pin 357. Counterclockwise rocking of the stop lever 340 will move the lower end of the pawl 343 against the ear 347 on the latch 232 so as to tension the spring 345. The detent 342 will then act to hold the lever 340 in its rocked position. When an add-back cycle occurs, causing the connecting lever 218 and the pin 234 thereon to be moved rearwardly, the latch 232 will be rocked counterclockwise so as to permit the spring 345 to rock the pawl 343 counterclockwise, and move the shoulder 346 thereon above the ear 347 on the latch 232. When the connecting lever 218 and pin 234 move forwardly following the add-back operation, the latch 232 will be held in its rocked position by the pawl 343, causing the pin 234 to be disengaged from the latch 232, thus enabling the connecting lever 218 to return to its unactuated position so as to stop the machine.

If the program control shaft 227 is in its leftmost or aligning position when it is desired to stop the machine, the bevelled cam 358 will stand aligned with the conical pin 357, and the pin 361 will be in the slot 362 because of the shaft 258 and arm 349 thereon being in actuated positions. Nevertheless, the relation of the parts is such that the stop lever 340 can be rocked forwardly without being blocked by the pin 361 and arm 359, the pin 361 merely being cammed or slipped out of the slot 362. The forward rocking of the lever 340 acts through the ear 352 to rock the bell crank 354 clockwise, and thus to move the conical pin 357 into the path of the bevelled cam 358. When the cam 358 engages the pin 357, the cam and the program control shaft 227 will be shifted axially to the right, thus conditioning the machine for a division operation. After the add-back phase of the ensuing division operation cycle, the pin 234 will be disengaged from the latch 232 which, at this time, will be held in its rearward position by the pawl 343 in the manner previously described. Consequently the connecting lever 218 will be returned to its unactuated position and the machine will stop.

I claim:

1. A calculating machine capable of carrying out problems in division comprising an amount entering means on which the various digits of a divisor may be set; a carriage mounted for endwise shifting movement on said machine; means for shifting said carriage in either direction; a register comprised of a plurality of numeral wheels rotatably mounted on said carriage, said wheels being settable to represent the various digits of a dividend; means for successively subtracting the divisor from the dividend, adding the divisor back into the dividend, and shifting said carriage one step in a predetermined direction so as to bring the higher order wheels of said register into active position with respect to said amount entering means; and means activated by a predetermined change in the registration in the highest order numeral wheel of said register for terminating the operation of said shifting means in said predetermined direction when the dividend and divisor are correctly aligned for the performance of a division operation.

2. In a machine of the class described having a plural order value entering means for receiving a divisor value, a register shiftable relative thereto for receiving a dividend value, means for shifting said register in one direction to bring the higher orders thereof into alignment with said value entering means or in another direction to bring the lower orders thereof into alignment with said value entering means, and means for causing the divisor value to be added to or subtracted from the dividend value, the combination of a program control device for controlling the operation of said adding and subtracting means and said shifting means, said device having an idle position in which it is ineffective to control the operation of either of said means, a factor aligning position in which it is effective to successively cause the divisor value to be subtracted from the dividend value, to be added back therein and said register to be shifted one step in said one direction, and a dividing position in which it is effective to successively cause the divisor value to be subtracted from the dividend value, to be added back therein and said register to be shifted one step in said other direction; means for initiating a division operation; means controlled by said initiating means for moving said device from its idle position to its factor aligning position and maintaining it there until said register has been shifted in said one direction to its factor aligning position; a tens-carry mechanism for causing a unit to be transferred from one order of the register to the next; and means controlled by said tens-carry mechanism for causing said device to be moved from its factor aligning position to its dividing position when a carry is effected in the highest order of the register.

3. In a machine of the class described having a plural order value entering means, a carriage shiftable relative thereto, and a register mounted on said carriage, the combination of means for shifting said carriage in either one direction or another, said means including a right-shift clutch for shifting said carriage in the direction of decreasing orders of said register and a left-shift clutch for shifting said carriage in the direction of increasing orders of said register; a program control device for controlling the operation of said shift clutches, said device including a shaft capable of being shifted axially from an idle position to either a factor aligning position or a dividing position; means for rotating said shaft in either its factor aligning position or its dividing position; means controlled by said program control device shaft in either the factor aligning or the dividing position thereof for entering values in said register; means on said shaft for causing said right-shift clutch to be engaged when said shaft is rotated in its factor aligning position and for causing said left-shift clutch to be engaged when said shaft is rotated in its dividing position; means for initiating a division operation; means controlled by said initiating means for causing said shaft to be shifted from its idle position to its factor aligning position where rotation of said shaft by said rotating means will cause said right-shift clutch to be engaged; a tens-carry mechanism for causing a unit to be transferred from one order of the register to the next order thereof consequent upon a predetermined registration change in one of said orders; and means controlled by said tens-carry mechanism for causing said shaft to be shifted from its factor aligning position to its dividing position where rotation of said shaft by said rotating means will cause said left-shift clutch to be engaged.

4. In a machine of the class described for solving problems in division, the combination of means for receiving one of the factors of a division problem; means for receiving another of the factors of a division problem; means for shifting one of said factor receiving means relative to the other including a first clutch for shifting said one of said factor receiving means in one direction and a second clutch for shifting said one of said factor receiving means in another direction; means for selectively engaging one or the other of said clutches including a rotatable member shiftable along its axis of rotation to either of two positions; means for rotating said member in either of said positions; means for causing said first clutch to be engaged when said member is rotated in one of said positions and to cause said second clutch to be engaged when said member is rotated in the other of said positions; means for shifting said member to its position for effecting engagement of said first clutch to effect shifting of said one of said factor receiving means to a position in which the division problem factors are aligned for the commencement of a division operation; means responsive to arrival of said one of said factor receiving means in the factor aligning position for shifting said member to its position for effecting engagement of said second clutch; and means for then performing a division operation.

5. In a machine of the class described having a plural order value entering means, a register shiftable relative thereto, and means for shifting said register in one direction so as to bring the higher orders thereof into alignment with said value entering means or in another direction so as to bring the lower orders thereof into alignment with said value entering means, the combination of a program control device for controlling the operation of said shifting means, said device having an idle position in which it is ineffective to control said shifting means, a factor aligning position in which it is effective to cause said shifting means to shift said register in said one direction, and a dividing position in which it is effective to cause said shifting means to shift said register in said other direction; means controlled by said program control device in either its factor aligning position or its dividing position for entering values in said register; means for initiating a division operation, means controlled by said initiating means for moving said device from its idle position to its factor aligning position; a tens-carry mechanism for causing a unit to be transferred from one order of the register to the next order thereof consequent upon a predetermined registration change in one of said orders; means for moving said program control device from said factor aligning position to said dividing position; a member controlled by said tens-carry mechanism for causing said last-named means to move said device to its dividing position when a carry is effected in the highest order of the register, said member having an ineffective position and an effective position; and means controlled by said initiating means for moving said member from its ineffective position to its effective position when a division operation is initiated.

6. In a machine of the class described having a shiftable carriage, a dividend register in said carriage, means for shifting said carriage either to the right or to the left including a right shift clutch for shifting said carriage to the right and a left shift clutch for shifting said carriage to the left, a keyboard on which the various digits of a divisor may be set, and a reversible transmission mechanism for enabling a divisor set up on said keyboard to be entered either additively or subtractively into said register, the combination of a program control mechanism for controlling the timing and operation of said reversible transmission mechanism and said carriage shifting means, said mechanism including a rotatable member which is shiftable along its axis of rotation to either of two positions; means including a part for shifting said member from one position to the other, and another part for shifting said member from said other position to said one position; means for rotating said member in either of said positions; and means for causing said right shift clutch to be engaged and said reversible transmission mechanism to be operated when said member is rotated in one of said positions so as to cause the sequence of addition, right shift, and subtraction, and for causing said left shift clutch to be engaged and said reversible transmission mechanism to be operated when said member is rotated in the other of said positions so as to cause the sequence of addition, left shift and subtraction.

7. In a machine of the class described having a keyboard, a carriage shiftable relative to said keyboard, mechanism for shifting said carriage, a register in said carriage, a differential actuating mechanism controlled by said keyboard, and a reversible transmission mechanism intermediate said actuating mechanism and said register for controlling the positive or negative entry of amounts on said keyboard into said register, the combination of a program control device for controlling the operation of said reversible transmission mechanism and said carriage shifting mechanism, said device being movable from a normal position in which it is ineffective to control the operation of said mechanisms to an active position in which it is effective to control the sequential operation of said mechanisms; means operable to initiate a division operation and including a normally unrestrained but restrainable part; and a normally ineffective blocking part movable into blocking position with respect to said restrainable part in response to movement of said program control device to its active position for preventing operation of said division operation initiating means when said device is in its active position.

8. In a machine of the class described having a keyboard, a carriage shiftable relative to said keyboard, mechanism for shifting said carriage, a register in said carriage, a differential actuating mechanism controlled by said keyboard, and a reversible transmission mechanism intermediate said actuating mechanism and said register for controlling the positive or negative entry of amounts into said register, the combination of a program control device for controlling the operation of said reversible transmission mechanism and said carriage shifting mechanism, said device being movable from a normal position in which it is ineffective to control the operation of said mechanisms to an active position in which it is effective to control the sequential operation of said mechanisms; a spring-urged device operable to initiate a division operation; means for restraining said spring-urged device against operation; a manipulable member for disabling said restraining means; and means, including an element movable with said program control device, for preventing operation of said spring-urged device upon the disabling of said restraining means when said program control device is in its active position.

9. In a machine of the class described having a keyboard, a carriage shiftable relative to said keyboard, mechanism for shifting said carriage, a register in said carriage, a differential actuating mechanism controlled by said keyboard, and a reversible transmission mechanism intermediate said actuating mechanism and said register for controlling the positive or negative entry of amounts into said register, the combination of a program control device for controlling the operation of said reversible transmission mechanism and said carriage shifting mechanism, said device being movable from a normal position in which it is ineffective to control the operation of said mechanisms to either of two active positions in which it is effective to control the sequential operation of said mechanisms; means for initiating a division operation; means controlled by said initiating means for moving said program control device from its normal position to one of said active positions; a manually operated device for terminating a division operation; and means for preventing operation of said manually operated device so as to terminate the division operation when said program control device is in said one of said active positions.

10. The invention defined by claim 9 in which the means for preventing operation of the manually operable device comprises a member for locking said manually operated device against movement, in combination with means operable in response to the operation of said initiating means for rendering said locking member effective whereby movement of said manually operated device will be prevented.

11. In a machine of the class described having a keyboard, a carriage shiftable relative to said keyboard, mechanism for shifting said carriage, a register in said carriage, a differential actuating mechanism controlled by said keyboard, and a reversible transmission mechanism intermediate said actuating mechanism and said register for controlling the positive or negative entry of amounts into said register, the combination of a program control device for controlling the operation of said reversible transmission mechanism and said carriage shifting mechanism, said device being movable from a normal position in which it is ineffective to control the operation of said mechanisms to either a first or a second position in which it is effective to control the sequential operation of said mechanisms; means for initiating a division operation; means controlled by said initiating means for moving said program control device from its normal position to said first position; means operating in response to an overdraft in said register for moving said program control device from said first position to said second position; a manipulative device for terminating a division operation; means, including a locking member, for preventing manipulation of said device when said program control device is in said first position; and means for causing said locking member to be disabled when said program control device is moved to said second position whereby said manipulative device may be operated and the division operation terminated.

12. In a calculating machine of the class described having means for receiving a dividend factor, means for receiving a divisor factor, and means for shifting one of said factor receiving means relative to the other of said factor receiving means, the combination of a division control mechanism for successively causing the divisor factor to be subtracted from the dividend factor and to be added back therein and the shifting means to be operated so as to cause said one factor receiving means to be shifted in one direction relative to the other factor receiving means so as to perform a division operation; means for controlling said division control mechanism so as to successively cause the divisor factor to be subtracted from the dividend factor and to be added back therein and the shifting means to be operated so as to cause said one factor receiving means to be shifted in another direction relative to the other factor receiving means to position said factors in proper alignment for the performance of a division operation; means for initiating operation of said division mechanism and said controlling means so as to cause the divisor factor to be subtracted from the dividend factor and to be added back therein and said one factor receiving means to be shifted in said other direction relative to the other factor receiving means; and means rendered active when said one factor receiving means reaches the limit of its movement in said other direction for disabling said controlling means whereby the divisor factor will be subtracted from the dividend factor and said one factor receiving means will be shifted in said one direction relative to the other factor receiving means.

13. In a calculating machine of the class described having an amount entering means for receiving a divisor factor, a register for receiving a dividend factor, and means for shifting said register relative to said amount entering means, the combination of a division control mechanism for successively causing the divisor factor to be subtracted from the dividend factor and to be added back therein and said register to be shifted in one direction relative to said amount entering means so as to perform a division operation; means for controlling said division control mechanism so as to successively cause the divisor factor to be subtracted from the dividend factor and to be added back therein and said register to be shifted in another direction relative to said amount entering means to position said factors in proper alignment for the performance of a division operation; means for initiating operation of said division control mechanism and said controlling means so as to cause the divisor factor to be subtracted from the dividend factor and to be added back therein and said register to be shifted in said other direction relative to said amount entering means; and means operable by said shifting means when said register reaches the limit of its movement in said other direction for disabling said controlling means whereby the divisor factor will be subtracted from the dividend factor and said register will be shifted in said one direction relative to said amount entering means.

14. In a machine of the class described having a value entering means for receiving a divisor factor, a register shiftable relative thereto for receiving a dividend factor, means for shifting said register in one direction to bring the higher orders thereof into alignment with said value entering means or in another direction to bring the lower orders thereof into alignment with said value entering means, and means for causing the divisor factor to be subtracted from the dividend factor and to be added back therein, the combination of a program control device for controlling the operation of said subtracting and adding back means and said shifting means, said device having an idle position in which it is ineffective to control the operation of either of said means, a factor aligning position in which it is effective to successively cause the divisor factor to be subtracted from the dividend factor and to be added back therein and said register to be shifted one step in said one direction to position said factors in proper alignment for the performance of a division operation, and a dividing position in which it is effective to successively cause the divisor factor to be subtracted from the dividend value and to be added back therein and said register to be shifted one step in said other direction for the performance of a division operation; means for initiating a division operation; means controlled by said initiating means for moving said device from its idle position to its factor aligning position; and means rendered effective when said register reaches the limit of its movement in said one direction to cause said device to be moved from its factor aligning position to its dividing position.

15. A calculating machine capable of carrying out problems in division comprising an indexing means on which the various digits of a divisor may be set; a carriage mounted for endwise shifting movement on said machine; means for shifting said carriage in either direction; a register comprised of a plurality of numeral wheels rotatably mounted on said carriage, said wheels being settable to represent the various digits of a dividend; means for transmitting a value set in said indexing means into said register additively or subtractively; division control means for controlling operation of said transmitting means and said shifting means to successively subtract the divisor from the dividend until an overdraft in said register, add the divisor back to the dividend, and shift said carriage one step in the direction to bring the lower order wheels of said register into active position with respect to said amount entering means; means for initiating operation of said division control means; means also operated by said last-mentioned means for modifying operation of said division control means to effect a single subtraction of the divisor from the dividend, then add the divisor back into the dividend, and finally shift the carriage one step in the opposite direction; and means activated by an overdraft in the registration in the highest order numeral wheel of said register for terminating the operation of said modifying means, thereby terminating said shift in said opposite direction and enabling normal operation of said division control means.

16. In a calculating machine of the class described having cyclically operable drive means, a carriage shiftable either to the right or to the left, a register mounted in said carriage for receiving a dividend factor, and means including a keyboard and a differential actuating mechanism for entering a divisor into said register, the combination of a program control mechanism for automatically causing said machine to operate through a sequence of add, shift and subtract cycles, said program control mechanism including a shiftable member movable from a normal inoperative position to a first position to cause shifting of said carriage to the right and to a second position to cause shifting of the carriage to the left, a divide key, means controlled by said divide key for moving said shiftable member to the first position, means for holding said member in said first position, means operative so long as said member is held in said first position to cause said program control mechanism to operate in sequential cycles, means operating in response to an overdraft in the highest order of said register for causing said member to be moved to said second position, whereby the operation of said program control mechanism under the control of said member will be terminated and the machine will be conditioned for left-hand shifting of the carriage.

17. In a machine of the class described having an amount entering means in which the various digits of a divisor may be set, a shiftable carriage, a register mounted in said carriage upon which the various digits of a dividend may be registered, means for transmitting the divisor value from said amount entering means into said register, and means for shifting said carriage in either direction relative to said amount entering means, the combination of means for automatically dividing the dividend by the divisor including a division program member movable from an idle position to either of two active positions, in one of which it initiates a sequence of operations including the cycles of addition, right shift, and a single subtraction, and in the other of which operative positions it operates to initiate a sequence of operations including the cycles of addition, left shift, and repeated subtraction, means including a manipulative element for moving said member from its idle position to its first active position, means for retaining said member in such first active position, and means operating in response to an overdraft in the highest order of said register for releasing said retaining means and for moving said member to its other active position.

18. A calculating machine for dividing one number by another comprising cyclically operable drive means, a register for receiving the dividend factor, a keyboard for receiving the divisor factor, actuating means for transmitting a value set in the keyboard into the register additively or subtractively, means for shifting said register and said divisor factor receiving means ordinally relative to one another, a division control mechanism for controlling operation of the actuating means to subtract the divisor factor from said register and to intermittently operate the shifting means to shift said register and said keyboard relatively to one another in the direction to bring lower orders of the register into alignment with said keyboard during continuous, uninterrupted cycling of the machine in the performance of a division operation, means for modifying the control effected by said division control mechanism to cause said shifting means to operate under control of said division control mechanism to shift said register and said keyboard relative to one another in the opposite direction in uninterrupted sequence in order to bring said factors into proper alignment for the commencement of a division operation, means for simultaneously initiating operation of said division control mechanism and said modifying means, and means controlled by the highest order of said register for disabling said modifying means after the factors have been brought into alignment, and thereby enabling the machine to commence an automatic division operation.

19. A calculating machine adapted to perform division operations comprising a frame; a selection means mounted on said frame for receiving the various digits of a divisor; a register carriage mounted for endwise shifting movement on said frame; means for shifting said carriage; ordinally arranged register wheels rotatably mounted on said carriage, said wheels being settable to represent the various digits of a dividend; a tens-carry mechanism for transferring a unit from a lower order register wheel to a higher order register wheel; means for transmitting a value set in said selection means into said register additively or subtractively; a division control mechanism including means controlling operation of said transmitting means and said shifting means to successively subtract the divisor from the dividend, add the divisor back into the dividend, and shift said carriage one step in a given direction so as to bring the lower order wheels thereon into active position with respect to said transmitting means in the performance of a division operation; manual means for initiating operation of said division control mechanism; aligning means also operated by said manual means for modifying the control effected by said control mechanism to cause a single subtraction, an adding back of the divisor, and shifting of said carriage in the opposite direction in continuous cycles of operation so as to bring the higher order wheels thereon into active position with respect to said value entering means; and means activated by a predetermined change in the registration in the highest order register wheel for terminating operation of said aligning means, thereby terminating the shifting of said carriage in said opposite direction and reconditioning said division control mechanism to cause said shifting means to shift said carriage in said given direction when the dividend and the divisor are properly aligned for the performance of a division operation.

20. A calculating machine capable of carrying out problems in division comprising a selection means on which the various digits of a divisor may be set; a carriage mounted for endwise shifting movement on said machine; means for shifting said carriage in either direction; a register comprised of a plurality of numeral wheels rotatably mounted on said carriage, said wheels being settable to represent the various digits of a dividend; tens- transfer devices between the respective numeral wheels; means for transmitting a value set in said selection means into said register additively or subtractively; division control means for controlling operation of said transmitting means and said shifting means to successively subtract the divisor from the dividend until an overdraft in said register, add the divisor back to the dividend, and shift said carriage one step in the direction to bring the lower order wheels of said register into active position with respect to said amount entering means; aligning means cooperating with said division control means and operative to temporarily modify the operation of said division control means to cause a continuous series of operations including a cyclic shift of said carriage in the opposite direction; manually operated means for initiating operation of said division control means and said aligning means; and means controlled by a tens-transfer in the highest order numeral wheel of said register for terminating the operation of said aligning means, whereby the division control means is then enabled to operate to divide the dividend by the divisor.

21. In a machine of the class described having a divisor factor receiving means in which the various digits of a divisor may be set, a dividend factor receiving means in which the various digits of a dividend may be set, tens-transfer devices for the respective orders of the dividend factor receiving means, means for detecting a tens-transfer in the highest order of said dividend factor receiving means, means for transmitting a divisor set up in said divisor factor receiving means into said dividend factor receiving means, and shifting means operable to shift said divisor factor receiving means and said dividend factor receiving means relative to one another, the combination of means for dividing the dividend by the divisor including a sequence control member movable from an idle position to an active position and a shift initiating member movable to one position to operate said shifting means to cause shifting of said shiftable factor receiving means in the direction to bring the higher orders of the dividend factor receiving means into active position with respect to the divisor factor receiving means and to another position to operate said shifting means to cause shifting in the opposite direction, manually operated means for moving said shift initiating member to its one position and for operating said sequence control member in predetermined sequential cycles of operation including a subtraction and a carriage shift, means operated by said detecting means for causing said shiftable member to be moved to its other position and for conditioning said sequence control member to thereafter be operated only on response to a tens-transfer in a predetermined order of said dividend factor receiving means.

22. A calculating machine for dividing one number by another comprising a plural order selection means, a plural order register means, tens-transfer devices for the respective orders of said register means, a differential actuator for transmitting a value determined by the selection means additively or subtractively into the register, mechanism for shifting one of said means relative to the other, division control mechanism operative to control operation of said actuator and said shifting mechanism in a division operation including a device for operating said shifting mechanism in a direction to bring the lower orders of the register means into alignment with the selection means, a manipulatable member for initiating operation of said control mechanism, means operated by said member and operative to temporarily modify operation of said division control means to operate said actuator and shifting mechanism to subtract the value in the selection means from the value in the register means and to shift said shiftable means in the opposite direction, and means controlled from a tens-transfer in the highest order of the register means for releasing said means for temporarily modifying operation of said division control means for terminating operation of said shifting means in the opposite direction, and for enabling the division control means to effect a division operation.

GRANT C. ELLERBECK.

References Cited in the file of this patent

UNITED STATES PATENTS

| Number | Name | Date |
|---|---|---|
| 2,327,981 | Friden | Aug. 31, 1943 |
| 2,365,507 | Allen | Dec. 19, 1944 |
| 2,408,097 | Pott | Sept. 24, 1946 |
| 2,416,809 | Avery | Mar. 4, 1947 |